(12) United States Patent
Oh et al.

(10) Patent No.: US 12,301,872 B2
(45) Date of Patent: May 13, 2025

(54) DEVICE AND METHOD FOR PROCESSING POINT CLOUD DATA

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/658,345

(22) Filed: May 8, 2024

(65) Prior Publication Data

US 2024/0298029 A1    Sep. 5, 2024

Related U.S. Application Data

(63) Continuation of application No. 17/621,463, filed as application No. PCT/KR2020/006959 on May 29, 2020, now Pat. No. 12,010,341.

(30) Foreign Application Priority Data

Jun. 21, 2019  (KR) .......................... 10-2019-0074299

(51) Int. Cl.
| | | |
|---|---|---|
| *H04N 19/597* | (2014.01) | |
| *H04N 19/167* | (2014.01) | |
| *H04N 19/30* | (2014.01) | |
| *H04N 19/42* | (2014.01) | |
| *H04N 19/96* | (2014.01) | |

(52) U.S. Cl.
CPC ......... *H04N 19/597* (2014.11); *H04N 19/167* (2014.11); *H04N 19/30* (2014.11); *H04N 19/42* (2014.11); *H04N 19/96* (2014.11)

(58) Field of Classification Search
CPC .... H04N 19/597; H04N 19/167; H04N 19/30; H04N 19/42; H04N 19/96
See application file for complete search history.

(56) References Cited

U.S. PATENT DOCUMENTS

| | | | | |
|---|---|---|---|---|
| 11,544,819 | B2* | 1/2023 | Yea | G06T 9/005 |
| 11,546,582 | B2* | 1/2023 | Son | H04N 19/597 |
| 11,551,334 | B2* | 1/2023 | Yea | G06T 9/40 |
| 11,568,514 | B2* | 1/2023 | Hur | G06T 17/20 |
| 2016/0086353 | A1* | 3/2016 | Lukac | G06T 9/00 |
| | | | | 345/419 |
| 2019/0080483 | A1* | 3/2019 | Mammou | G06T 3/4007 |
| 2020/0105025 | A1* | 4/2020 | Yea | G06T 15/08 |
| 2020/0202608 | A1* | 6/2020 | Mekuria | H04L 65/80 |
| 2020/0204782 | A1* | 6/2020 | Najaf-Zadeh | H04N 19/167 |
| 2020/0211290 | A1* | 7/2020 | Choi | G06V 20/582 |
| 2020/0364904 | A1* | 11/2020 | Najaf-Zadeh | H04N 19/597 |
| 2021/0029187 | A1* | 1/2021 | Oh | H04L 65/61 |
| 2021/0049828 | A1* | 2/2021 | Park | H04N 19/30 |
| 2021/0104090 | A1* | 4/2021 | Hur | G06T 19/003 |

* cited by examiner

*Primary Examiner* — Zaihan Jiang

(74) *Attorney, Agent, or Firm* — Fish & Richardson P.C.

(57) ABSTRACT

A method for processing point cloud data according to embodiments may encode and transmit point cloud data. The method for processing point cloud data according to embodiments may receive and decode point cloud data.

12 Claims, 31 Drawing Sheets

FIG. 6
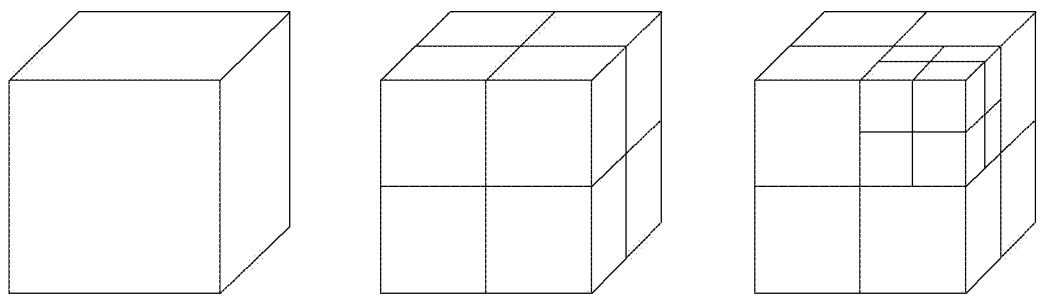
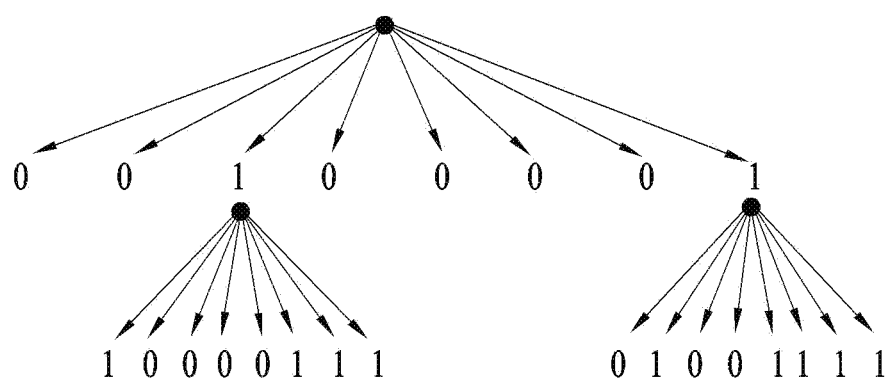

FIG. 7
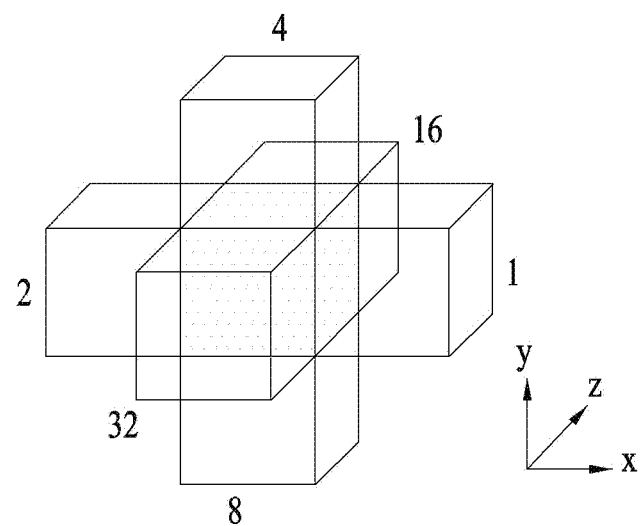
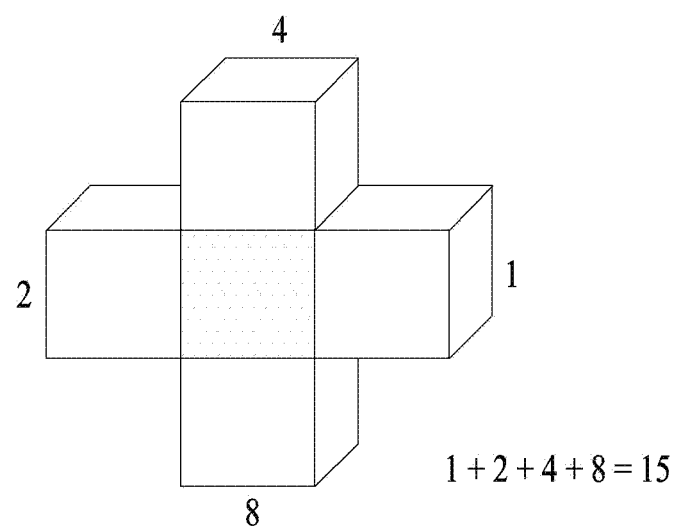
$1 + 2 + 4 + 8 = 15$

FIG. 25

| attribute_parameter_set( ) { | Descriptor |
|---|---|
| aps_attr_parameter_set_id | ue(v) |
| aps_seq_parameter_set_id | ue(v) |
| scalable_represenatation_available_flag | u(1) |
| if ( scalable_representation_available_flag == 1 ) { | |
| octree_colorization_type | u(2) |
| if ( octree_colorization_type == 0 ) { | |
| matched_attribute_type | u(3) |
| attribute_selection_type | |
| } | |
| else if ( octree_colorization_type == 1 ) { | |
| point_data_selection_type | u(3) |
| if ( point_data_selection_type == 0 || point_data_selection_type == 3) | |
| point_cloud_geometry_info_present_flag | u(1) |
| } | |
| } | |
| …… | |
| } | |

| general_attribute_slice_bitstream( ) { | Descriptor |
|---|---|
| attribute_slice_header( ) | |
| attribute_slice_data( ) | |
| } | |

2610

| attribute_slice_header( ) { | Descriptor |
|---|---|
| ash_attr_parameter_set_id | ue(v) |
| ash_attr_sps_attr_idx | ue(v) |
| byte_alignment( ) | |
| } | |

2620

| attribute_slice_data( ) { | Descriptor |
|---|---|
| dimension = attribute_dimension[ ash_attr_sps_attr_idx ] | |
| if( attr_coding_type == 0 ) | |
| PredictingWeight_Lifting_bitstream( dimension ) | |
| else if( attr_coding_type == 1 ) | |
| RAHT_bitstream( dimension ) | |
| else if( attr_coding_type == 2 ) | |
| FixedWeight_Lifting_bitstream( dimension ) | |
| if ( colorized_octree_position_present_flag == 1) | |
| ColorizedOctreePosition_bitstream( ) | |
| byte_alignment( ) | |
| } | |

2630

| ColorizedOctreePosition_bitstream( ) { | Descriptor |
|---|---|
| colorization_start_depth_level | u(8) |
| colorization_end_depth_level | u(8) |
| numOctreeDepthLevel = colorization_end_depth_level - colorization_start_depth_level + 1 | |
| for( i = 0; i < numOctreeDepthLevel ; i++ ) { | |
| num_colorized_nodes[i] | u(8) |
| for( j = 0; j < num_colorized_nodes[i]; j++ ) | |
| position_index [i][j] | u(8) |
| } | |
| } | |

DEVICE AND METHOD FOR PROCESSING POINT CLOUD DATA

CROSS-REFERENCE TO RELATED APPLICATIONS

This application is a continuation of U.S. application Ser. No. 17/621,463, filed on Dec. 21, 2021, which is a National Stage application under 35 U.S.C. § 371 of International Application No. PCT/KR2020/006959, filed on May 29, 2020, which claims the benefit of Korean Application No. 10-2019-0074299, filed on Jun. 21, 2019. The disclosures of the prior applications are incorporated by reference in their entirety.

TECHNICAL FIELD

The present disclosure provides a method for providing point cloud contents to provide a user with various services such as virtual reality (VR), augmented reality (AR), mixed reality (MR), and self-driving services.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, in some embodiments, a method for transmitting point cloud data may include: encoding the point cloud data including geometry information and attribute information and transmitting a bitstream including the encoded point cloud data. In some embodiments, the geometry information represents positions of points of the point cloud data and the attribute information represents attributes of the points of the point cloud data.

In some embodiments, a method for processing point cloud data may include receiving a bitstream including the point cloud data. In some embodiments, the point cloud data includes geometry information and attribute information, wherein the geometry information represents positions of points of the point cloud data, and the attribute information represents one or more attributes of the points of the point cloud data. The point cloud data processing method may include decoding the point cloud data.

In some embodiments, a method for processing point cloud data may include receiving a bitstream including the point cloud data and decoding the point cloud data. In some embodiments, the point cloud data includes geometry information and attribute information, wherein the geometry information represents positions of points of the point cloud data, and the attribute information indicating one or more attributes of the points of the point cloud data.

In some embodiments, a device for processing point cloud data may include a receiver configured to receive a bitstream including the point cloud data and a decoder configured to decode the point cloud data. In some embodiments, the point cloud data includes geometry information and attribute information, wherein the geometry information represents positions of points of the point cloud data, and the attribute information indicating one or more attributes of the points of the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

For a better understanding of various embodiments described below, reference should be made to the description of the following embodiments in connection with the accompanying drawings. In the drawings:

FIG. 6 shows an example of an octree and occupancy code according to embodiments;

FIG. 7 shows an example of a neighbor node pattern according to embodiments;

FIG. 25 shows an exemplary syntax for an APS according to embodiments;

FIG. 26 shows an exemplary syntax for an attribute slice bitstream according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
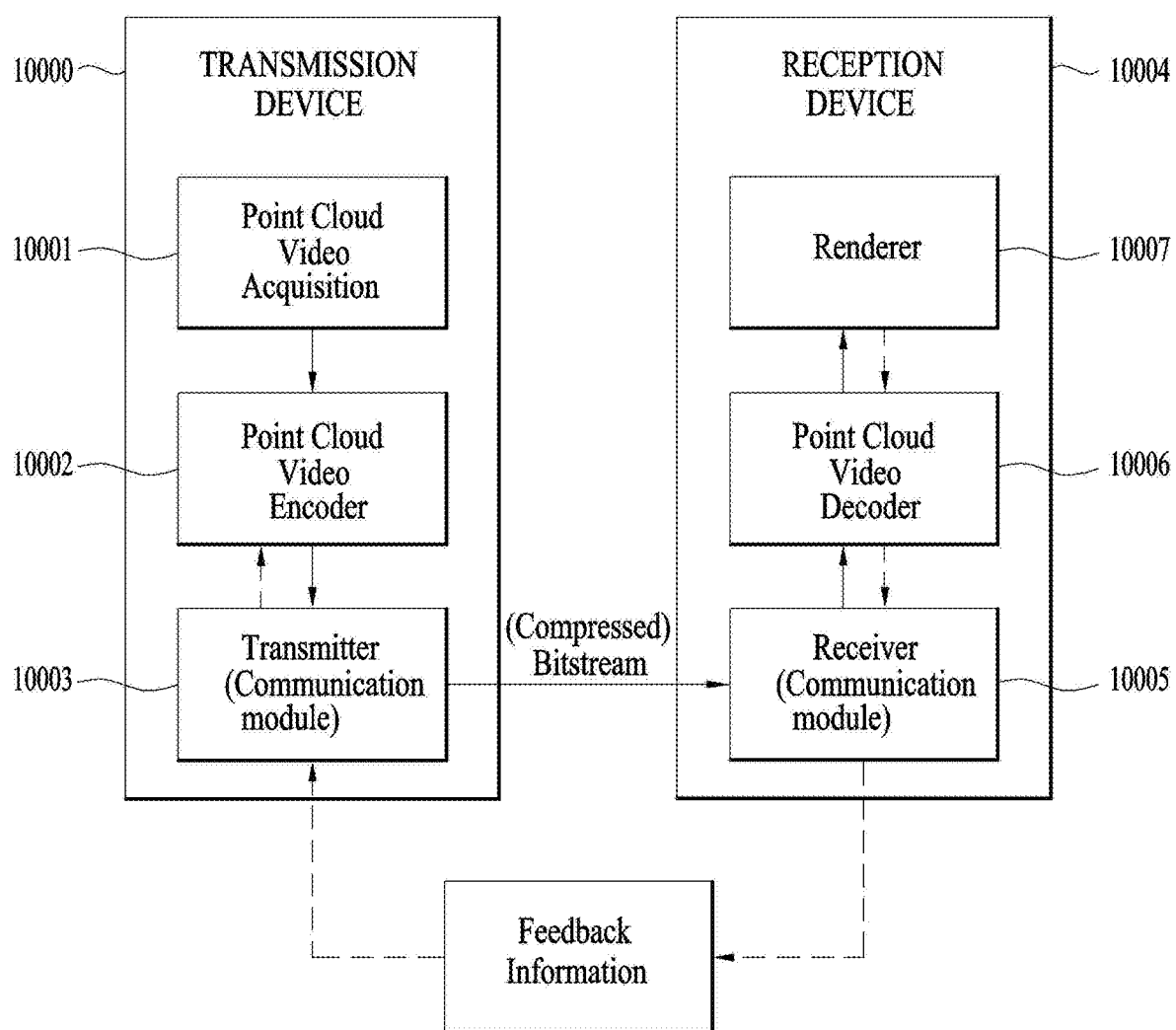
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT)

device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in the opposite process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
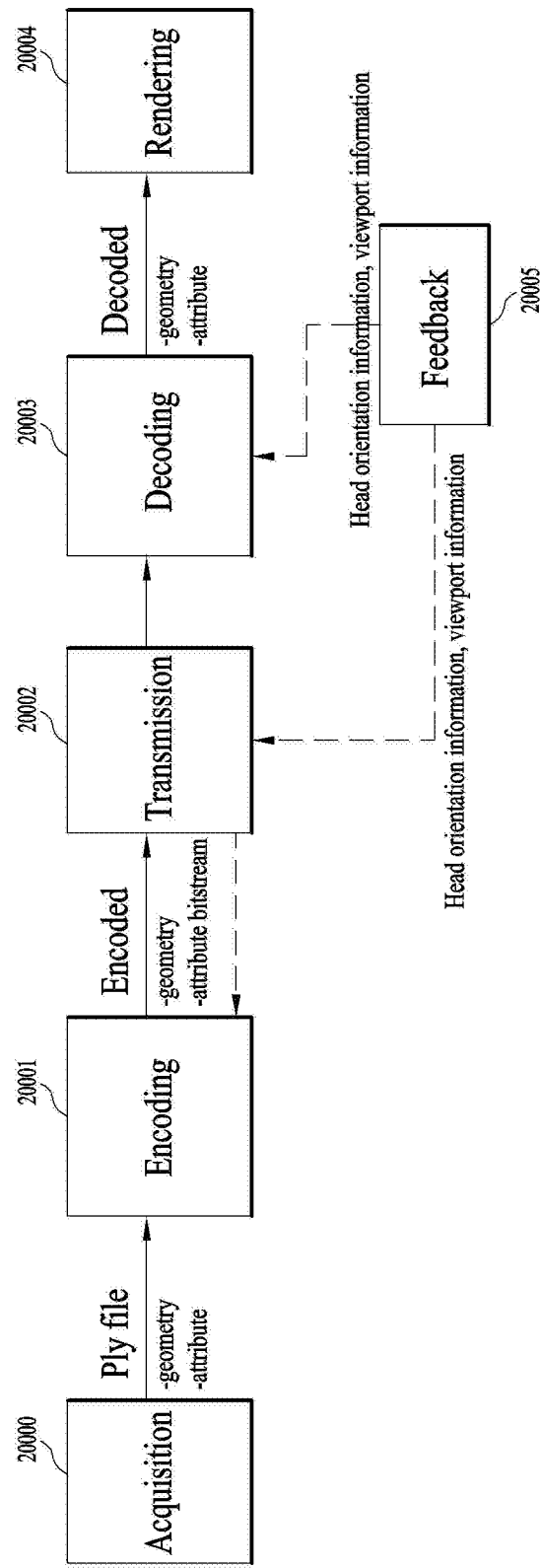
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
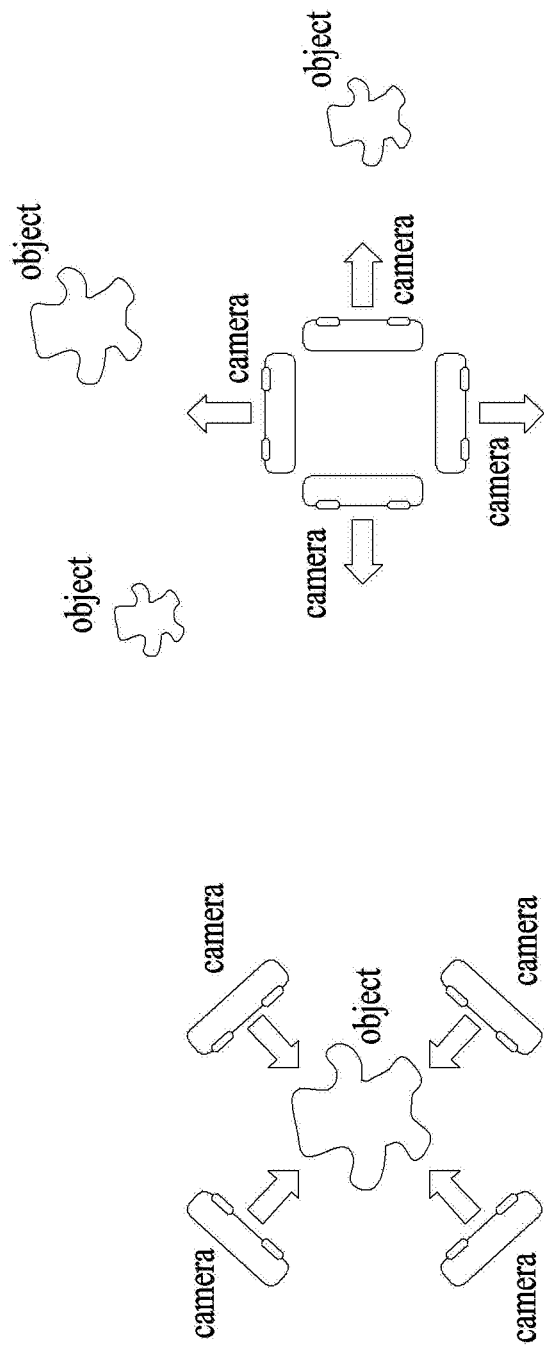
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
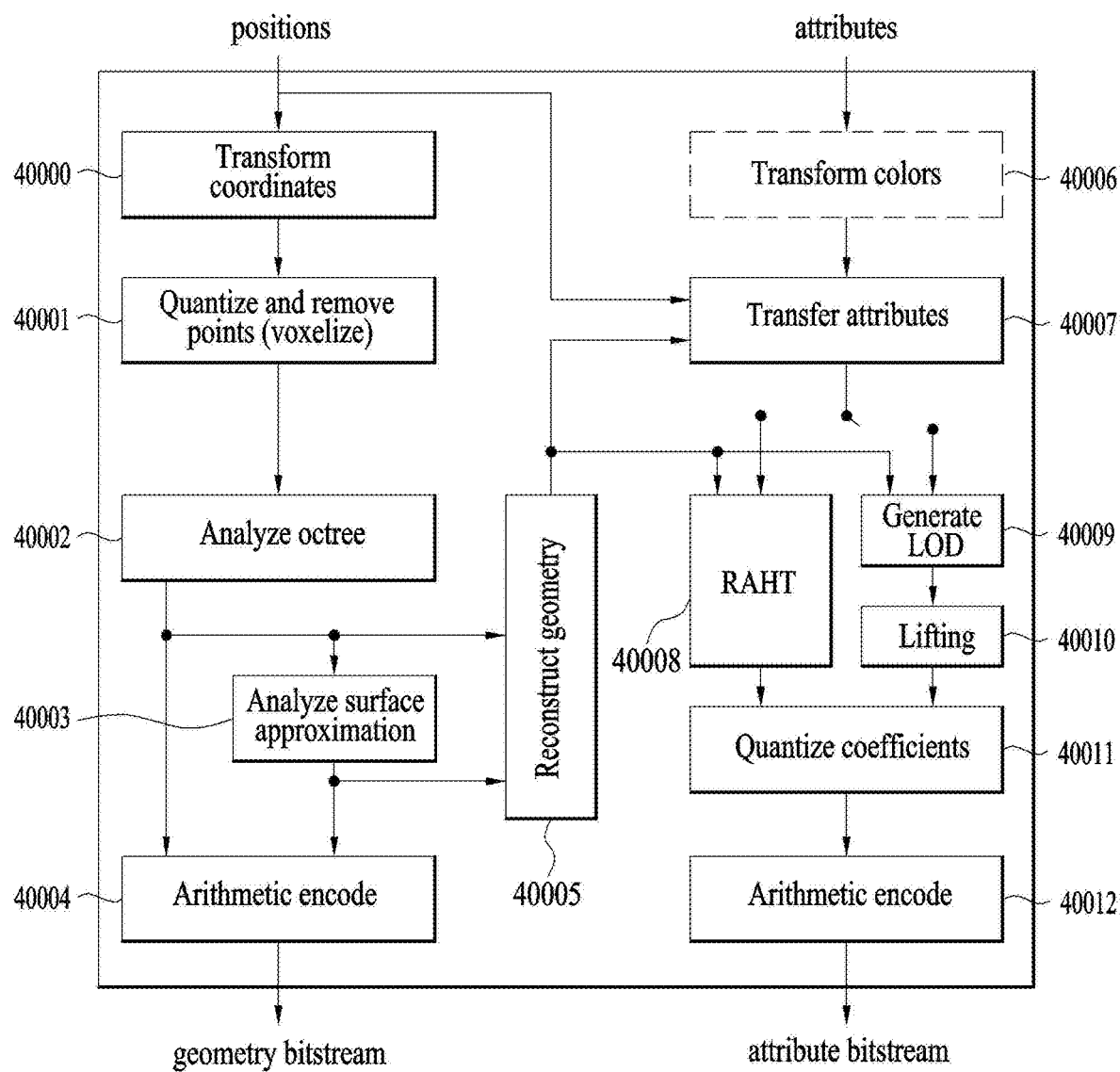
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighbor points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighbor points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
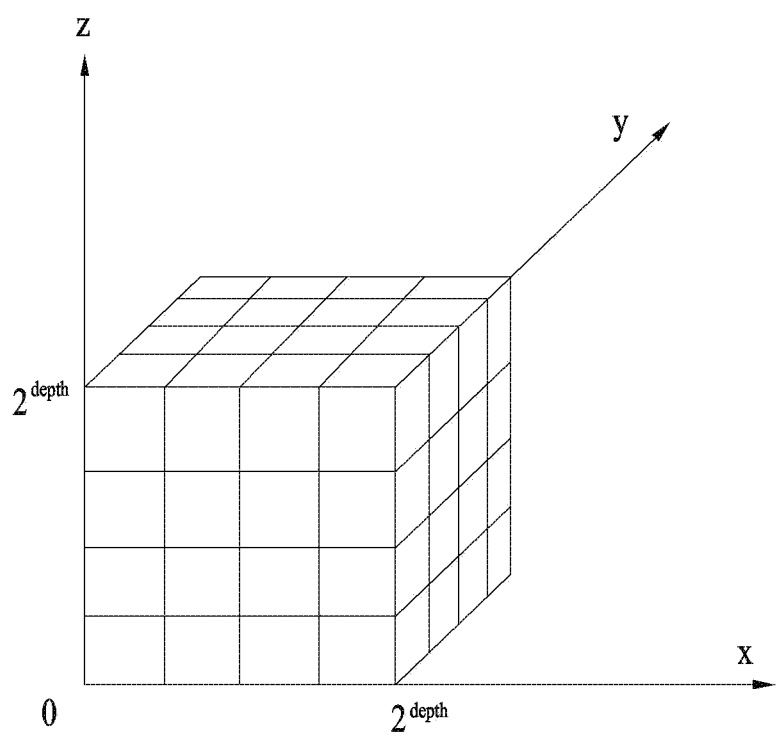
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, $2^d$ may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = \text{Ceil}(\text{Log2}(\text{Max}(x^{int}_n, y^{int}_n, z^{int}_n, n = 1, \ldots, N) + 1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

plane are (ai, bi), the value of θ is estimated through atan 2(bi, ai), and the vertices are ordered based on the value of 0. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE Triangles formed from vertices ordered 1

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 1 1), (11, 12, 1), (1, 3, 5), (5, 7, 9), (9, 11, 1), (1, 5, 9) |

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

$$\begin{bmatrix} \mu_x \\ \mu_y \\ \mu_z \end{bmatrix} = \frac{1}{n}\sum_{i=1}^{n} \begin{bmatrix} x_i \\ y_i \\ z_i \end{bmatrix} \quad 1)$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2)$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad 3)$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
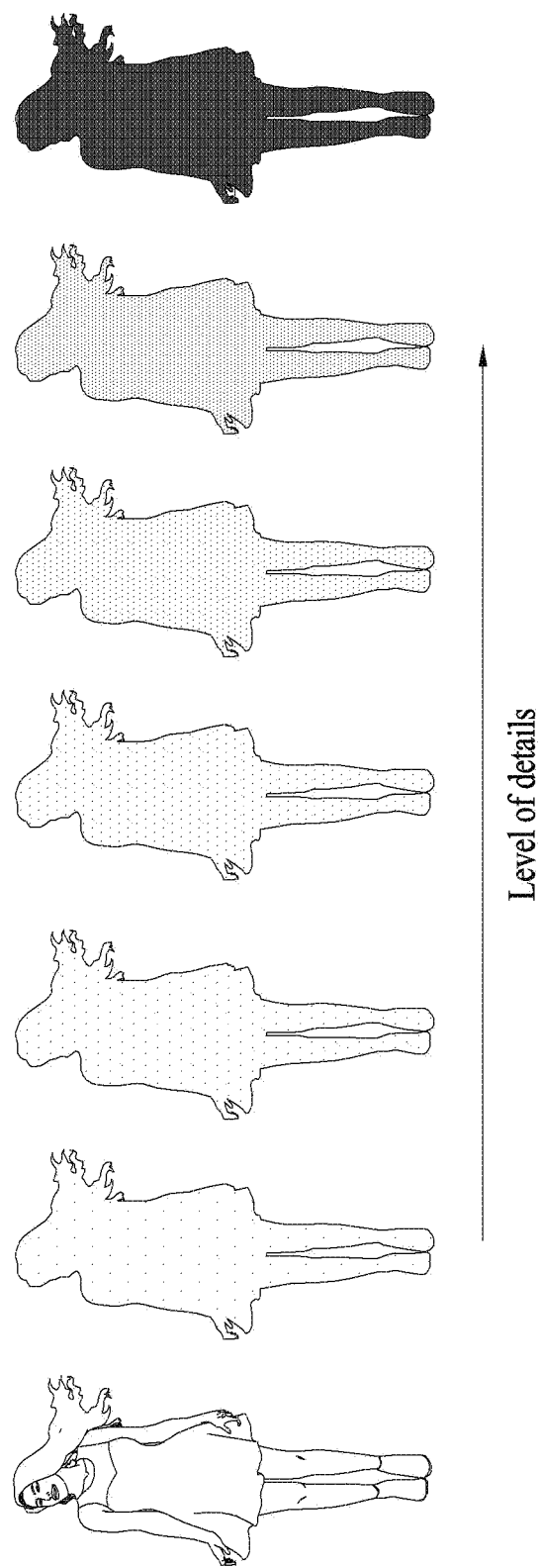
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
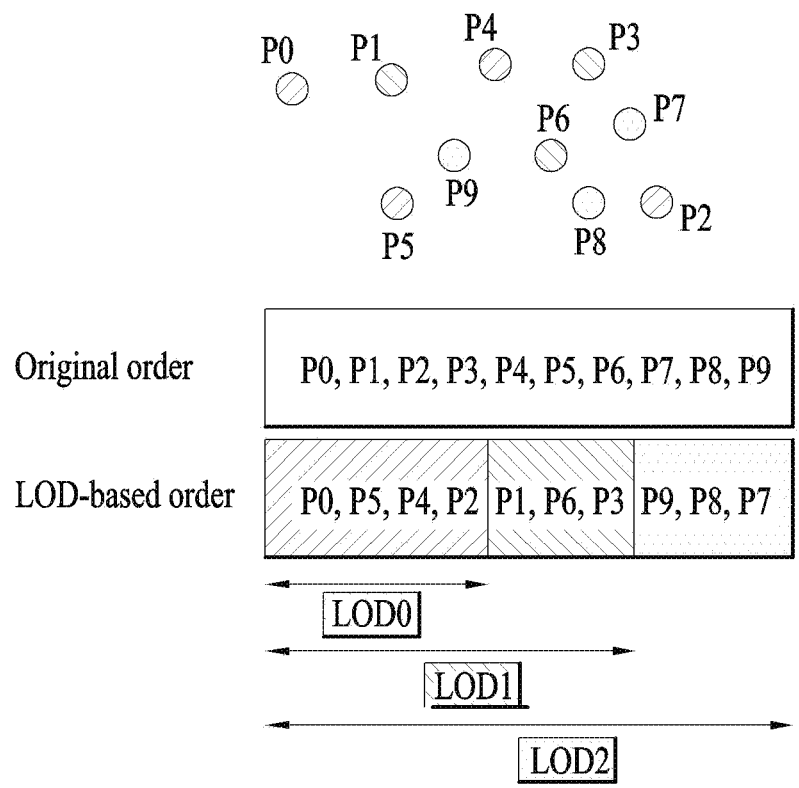
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighbor points present within a set distance for each LOD, and a distance to the neighbor points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code

TABLE 2

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE Attribute prediction residuals inverse quantization pseudo code

TABLE 3

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012)

may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ h_{l_{2x+1,y,z}} \end{bmatrix} T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000 \, w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
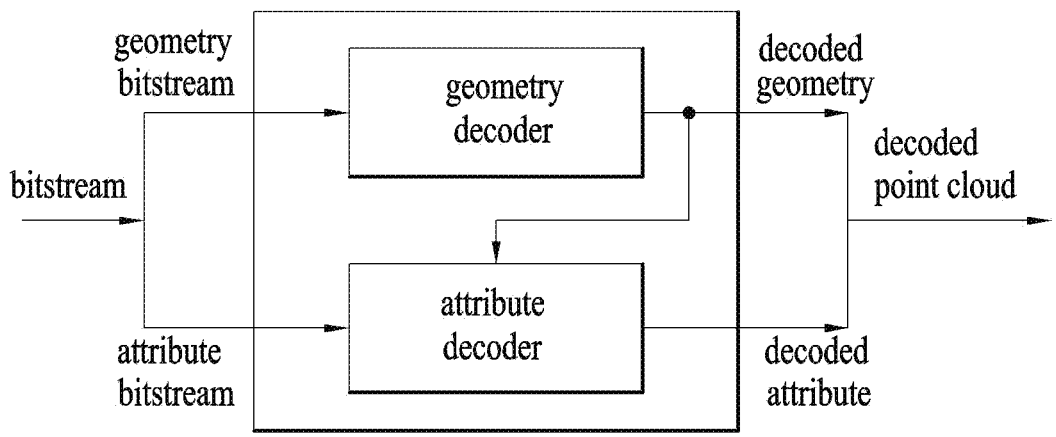
FIG. 10 illustrates an exemplary point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
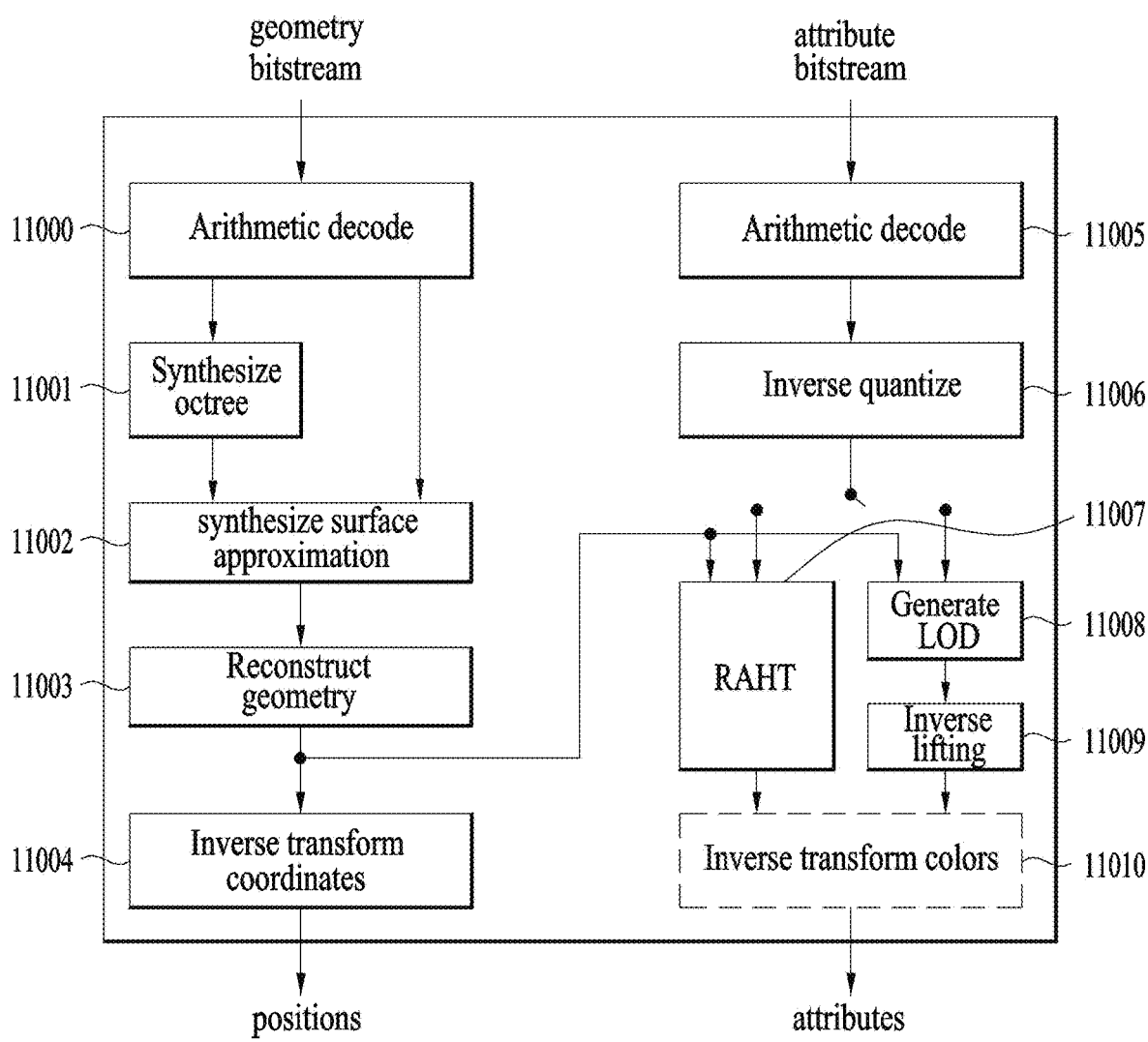
FIG. 11 illustrates an exemplary point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
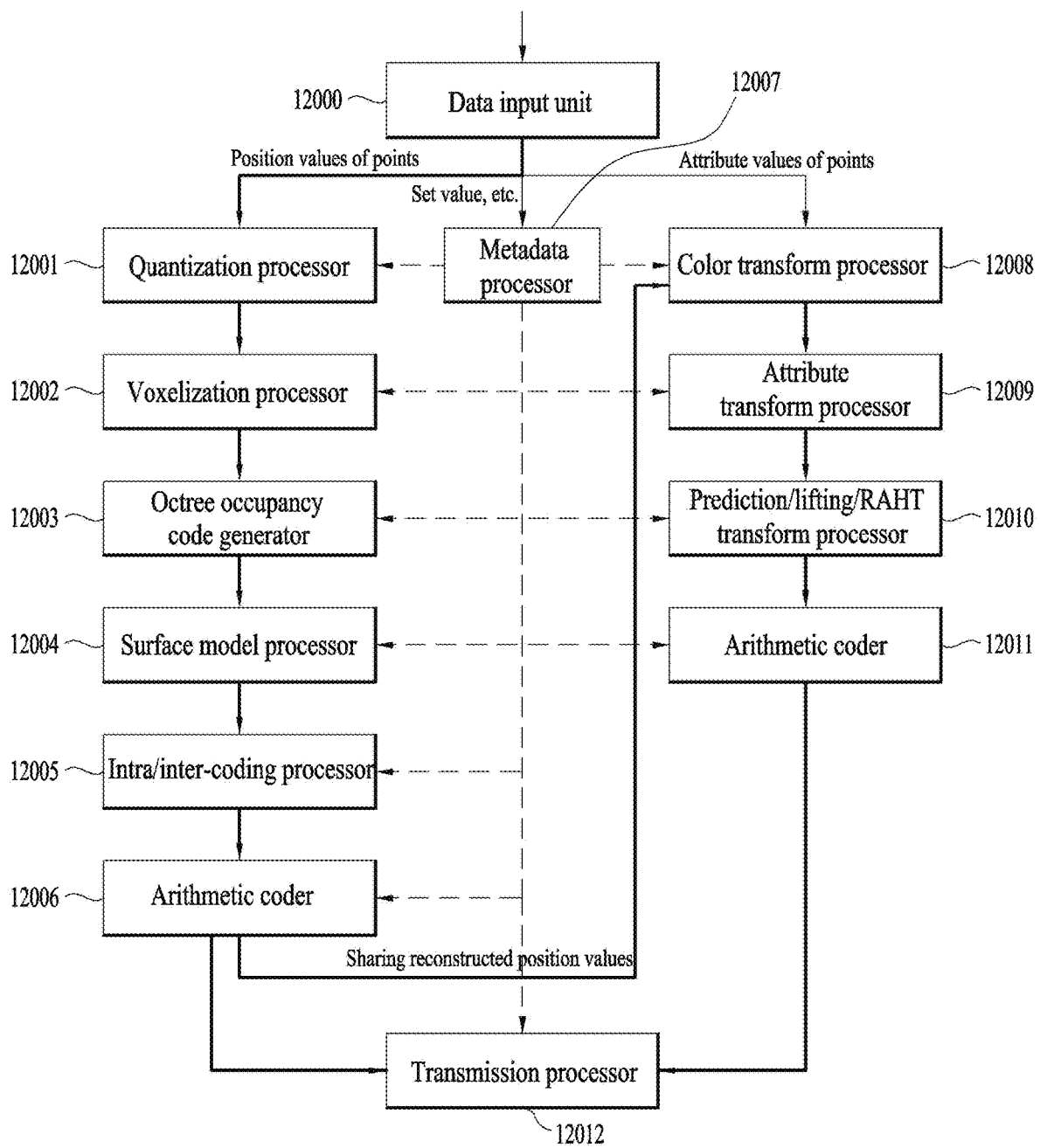
FIG. 12 illustrates an exemplary transmission device according to embodiments.

FIG. 12 illustrates an exemplary transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$. The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same or similar to the operation and/or transmission method of the transmitter 10003. Details are the same as those described with reference to FIGS. 1 and 2, and thus a description thereof is omitted.

Figure 13:
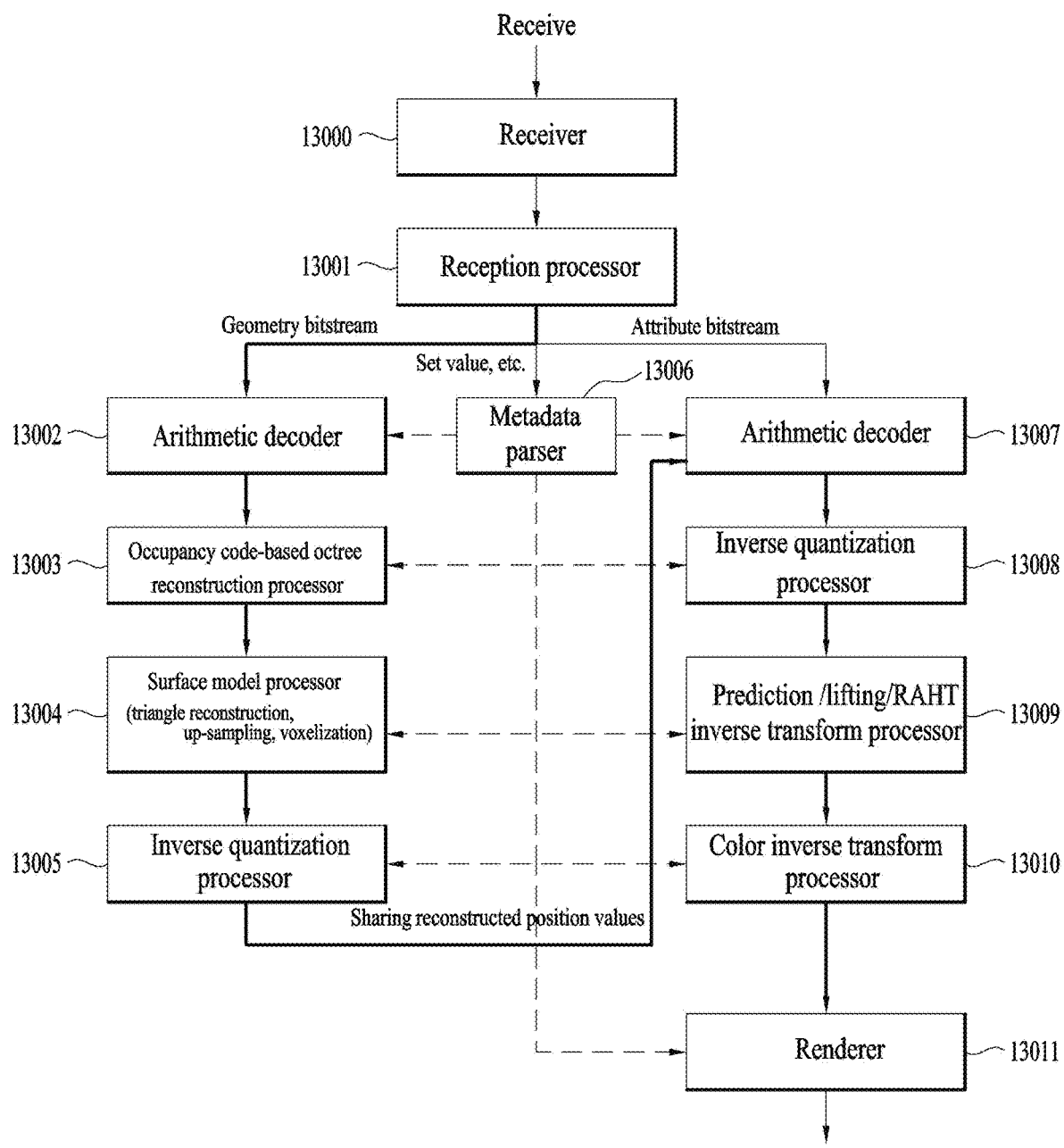
FIG. 13 illustrates an exemplary reception device according to embodiments.

FIG. 13 illustrates an exemplary reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same or similar to the operation and/or inverse transform coding of the color inverse transformer 11010. The renderer 13011 according to the embodiments may render the point cloud data.

Figure 14:
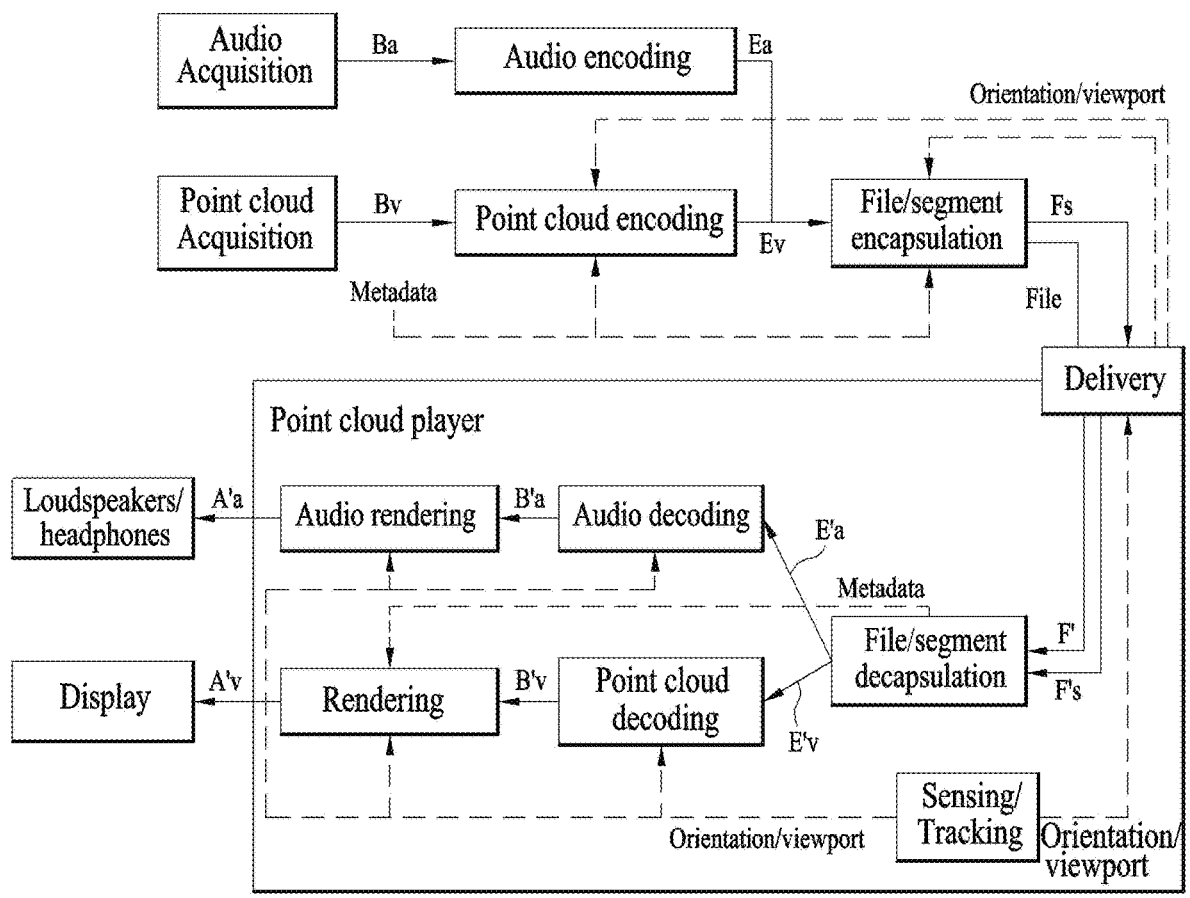
FIG. 14 illustrates an architecture for streaming G-PCC-based point cloud data according to embodiments.

FIG. 14 illustrates an architecture for streaming G-PCC-based point cloud data according to embodiments.

The upper part of FIG. 14 shows a process of processing and transmitting point cloud content by the transmission device described in FIGS. 1 to 13 (for example, the transmission device 10000, the transmission device of FIG. 12, etc.).

As described with reference to FIGS. 1 to 13, the transmission device may acquire audio Ba of the point cloud content (Audio Acquisition), encode the acquired audio (Audio Encoding), and output an audio bitstream Ea. In addition, the transmission device may acquire a point cloud (or point cloud video) By of the point cloud content (Point Acquisition), and perform point cloud encoding on the acquired point cloud to output a point cloud video bitstream Eb. The point cloud encoding of the transmission device is the same or similar to the point cloud encoding described with reference to FIGS. 1 to 13 (for example, the encoding of the point cloud encoder of FIG. 4), and thus a detailed description thereof will be omitted.

The transmission device may encapsulate the generated audio bitstream and video bitstream into a file and/or a segment (File/segment encapsulation). The encapsulated file and/or segment Fs, File may include a file in a file format such as ISOBMFF or a DASH segment. Point cloud-related metadata according to embodiments may be contained in the encapsulated file format and/or segment. The metadata may be contained in boxes of various levels on the ISOBMFF file format, or may be contained in a separate track within the file. According to an embodiment, the transmission device may encapsulate the metadata into a separate file. The transmission device according to the embodiments may deliver the encapsulated file format and/or segment over a network. The processing method for encapsulation and transmission by the transmission device is the same as that described with reference to FIGS. 1 to 13 (for example, the transmitter 10003, the transmission step 20002 of FIG. 2, etc.), and thus a detailed description thereof will be omitted.

The lower part of FIG. 14 shows a process of processing and outputting point cloud content by the reception device (for example, the reception device 10004, the reception device of FIG. 13, etc.) described with reference to FIGS. 1 to 13.

According to embodiments, the reception device may include devices configured to output final audio data and final video data (e.g., loudspeakers, headphones, a display), and a point cloud player configured to process point cloud content (a point cloud player). The final data output devices and the point cloud player may be configured as separate physical devices. The point cloud player according to the embodiments may perform geometry-based point cloud compression (G-PCC) coding, video-based point cloud compression (V-PCC) coding and/or next-generation coding.

The reception device according to the embodiments may secure a file and/or segment F', Fs' contained in the received data (for example, a broadcast signal, a signal transmitted over a network, etc.) and decapsulate the same (File/segment decapsulation). The reception and decapsulation methods of the reception device is the same as those described with reference to FIGS. 1 to 13 (for example, the receiver 10005, the reception unit 13000, the reception processing unit 13001, etc.), and thus a detailed description thereof will be omitted.

The reception device according to the embodiments secures an audio bitstream E'a and a video bitstream E'v contained in the file and/or segment. As shown in the figure, the reception device outputs decoded audio data B'a by performing audio decoding on the audio bitstream, and renders the decoded audio data (audio rendering) to output final audio data A'a through loudspeakers or headphones.

Also, the reception device performs point cloud decoding on the video bitstream E'v and outputs decoded video data B'v. The point cloud decoding according to the embodiments is the same or similar to the point cloud decoding described with reference to FIGS. 1 to 13 (for example, decoding of the point cloud decoder of FIG. 11), and thus a detailed description thereof will be omitted. The reception device may render the decoded video data and output final video data through the display.

The reception device according to the embodiments may perform at least one of decapsulation, audio decoding, audio rendering, point cloud decoding, and point cloud video rendering based on the transmitted metadata. The details of the metadata are the same as those described with reference to FIGS. 12 to 13, and thus a description thereof will be omitted.

As indicated by a dotted line shown in the figure, the reception device according to the embodiments (for example, a point cloud player or a sensing/tracking unit in the point cloud player) may generate feedback information (orientation, viewport). According to embodiments, the feedback information may be used in a decapsulation process, a point cloud decoding process and/or a rendering process of the reception device, or may be delivered to the transmission device. Details of the feedback information are the same as those described with reference to FIGS. 1 to 13, and thus a description thereof will be omitted.

Figure 15:
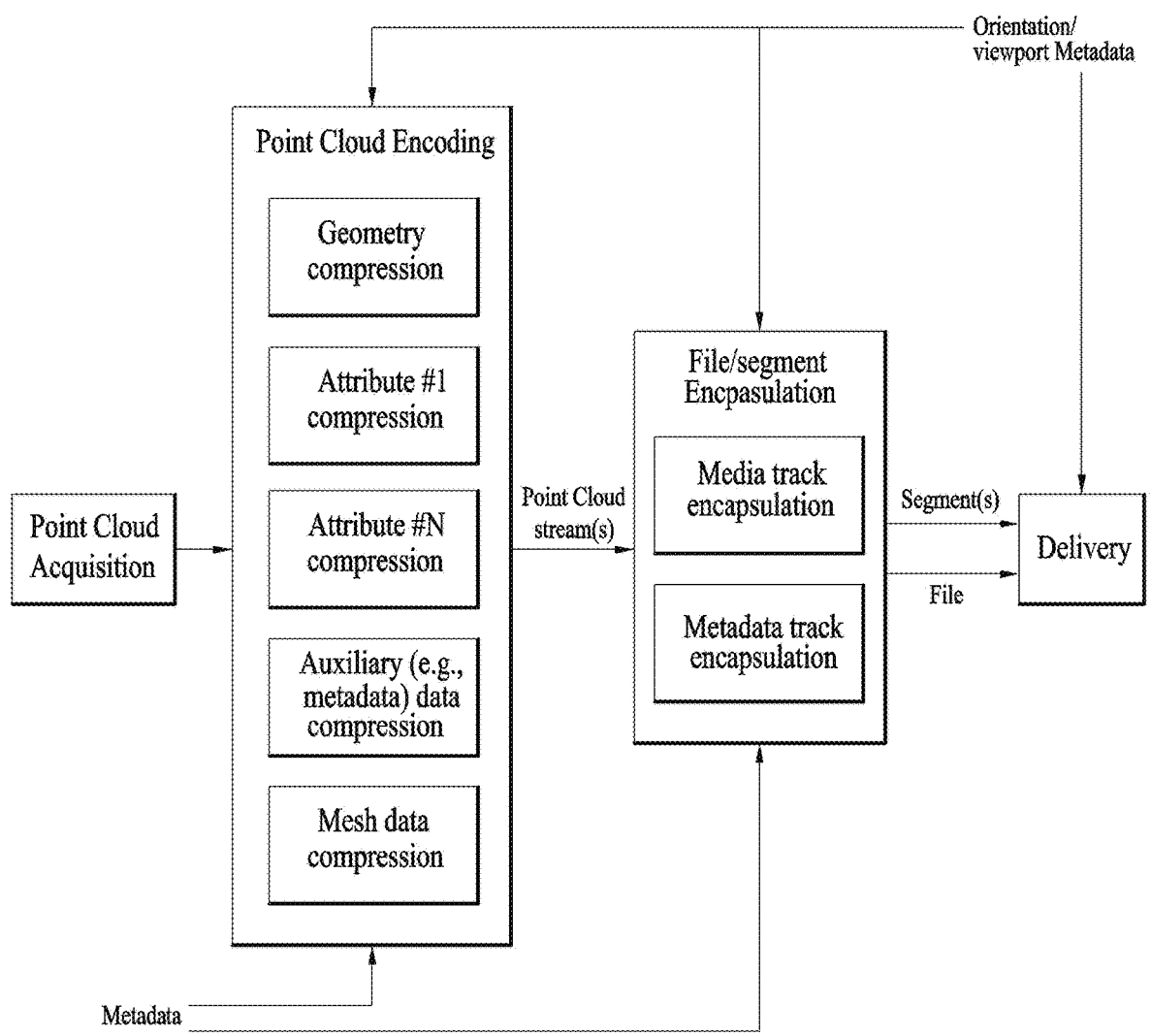
FIG. 15 illustrates an exemplary point cloud transmission device according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud encoding, file/segment encapsulation and delivery.

Since the operation of point cloud acquisition and delivery illustrated in the figure is the same as the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud encoding, file/segment encapsulation, and delivery operations based on the received feedback information. Details are the same as those described with reference to FIGS. 1 to 14, and thus a description thereof will be omitted.

Figure 16:
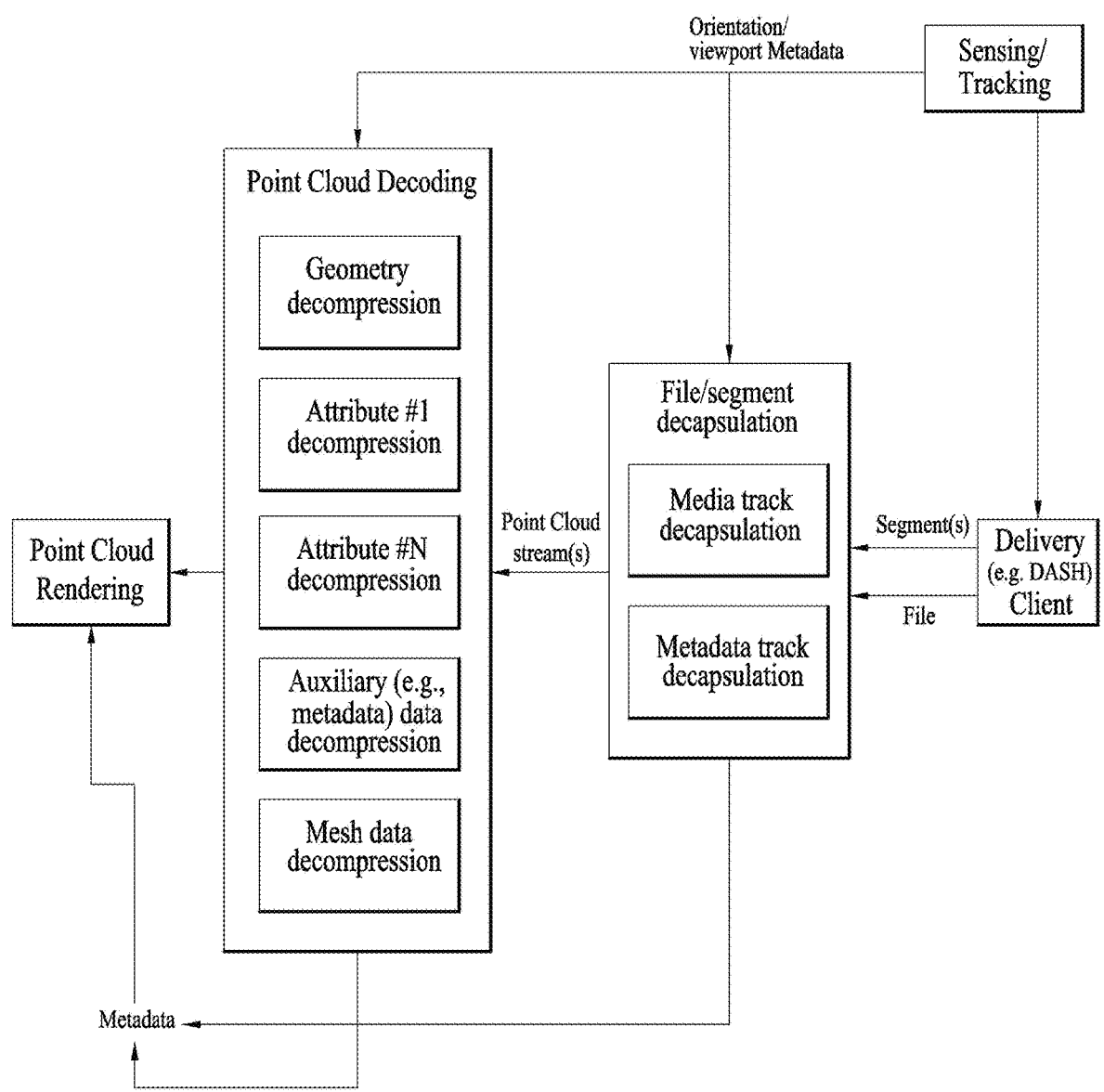
FIG. 16 illustrates an exemplary point cloud reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG. 16 may receive a signal transmitted from the transmission device of FIG. 15, and perform the opposite process of the operation of the transmission device of FIG. 15.

The reception device according to the embodiments may perform at least one of delivery, file/segment decapsulation, point cloud decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata. Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud decoding based on the feedback information. Details are the same as those described with reference to FIGS. 1 to 14, and thus a description thereof will be omitted.

Figure 17:
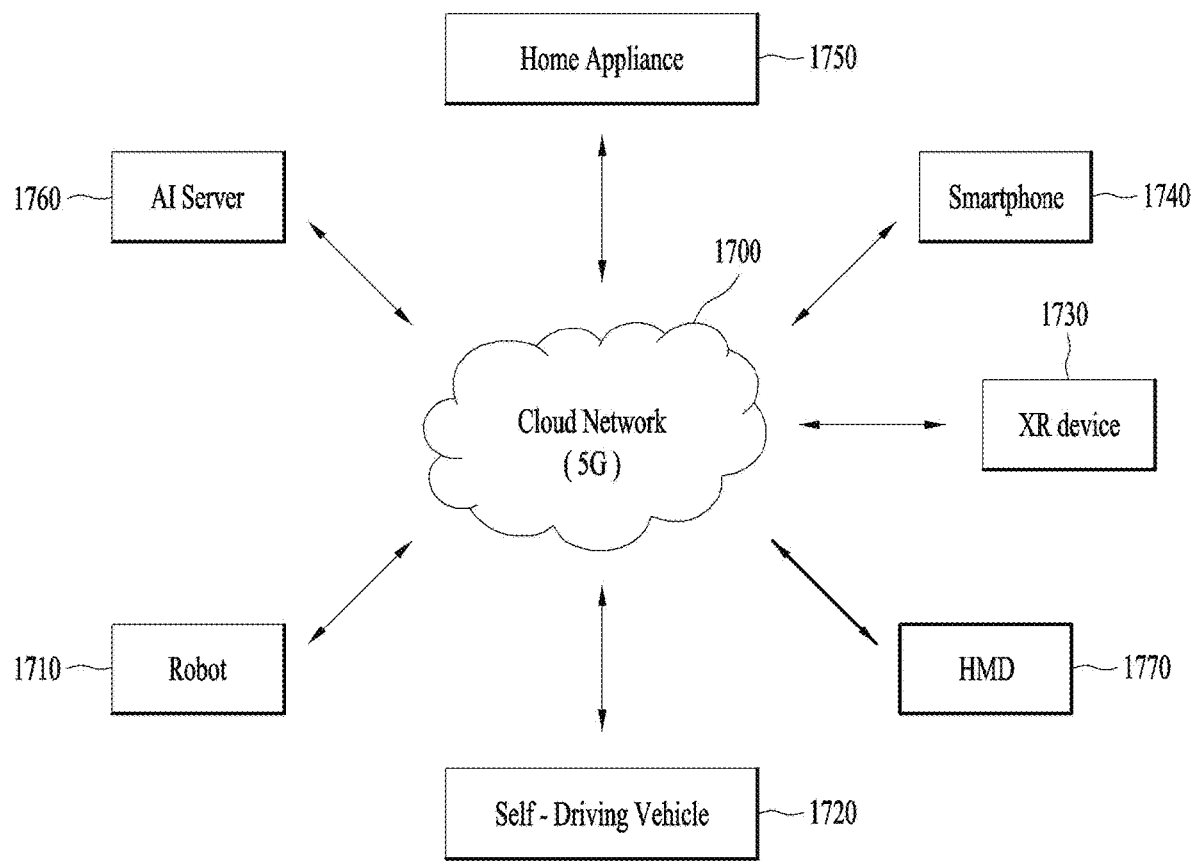
FIG. 17 shows an exemplary structure operatively connectable with a method/device for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 1760, a robot 1710, a self-driving vehicle 1720, an XR device 1730, a smartphone 1740, a home appliance 1750, and/or an HMD 1770 is connected to a cloud network 1700. The robot 1710, the self-driving vehicle 1720, the XR device 1730, the smartphone 1740, or the home appliance 1750 is referred to as a device. Further, the XR device 1730 may correspond to a point cloud data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist at least a part of the processing of the connected devices 1710 to 1770.

The HMD 1770 represents one of the implementation types of the XR device and/or the PCC device according to the embodiments. According to embodiments, an HMD type device includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission/reception device according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent an autonomous vehicle provided with means for providing an XR image, or an autonomous vehicle that is a target of control/interaction in the XR image. In particular, the self-driving vehicle 1720, which is a target of control/interaction in the XR image, may be distinguished from the XR device 1730 and may be operatively connected thereto.

The self-driving vehicle 1720 having means for providing an XR/PCC image may acquire sensor information from the sensors including a camera, and output the generated XR/PCC image based on the acquired sensor information. For example, the self-driving vehicle 1720 may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Scalable decoding according to embodiments is decoding selectively performed on some or all of geometry and/or attributes by the reception device (e.g., the reception device 10004 of FIG. 1, the point cloud decoder of FIGS. 10 and 11, or the reception device of FIG. 13) according to the decoding performance of the reception device. Some of the geometry and attributes according to the embodiments are called partial geometry and partial attribute. Scalable decoding applied to the geometry according to the embodiments is called scalable geometry decoding or geometry scalable decoding. Scalable decoding applied to the attributes according to the embodiments is called scalable attribute decoding or attribute scalable decoding. As described with reference to FIGS. 1 to 17, points of the point cloud content are distributed in a three-dimensional space, and the distributed points are represented in an octree structure. The octree structure is an octal tree structure, and the depth thereof increases from a higher node to a lower node. The depth according to the embodiments is referred to as a level and/or a layer. Thus, to provide low-resolution point cloud content, the reception device may perform geometry decoding (or geometry scalable decoding) on the partial geometry and/or partial attribute (or attribute scalable decoding) on partial attributes from a higher node to a lower node corresponding to a specific depth or level in the octree structure. In addition, the reception device may perform geometry and attribute decoding corresponding to the entire octree structure to provide high-resolution point cloud content. The reception device according to the embodiments performs scalable point cloud representation or scalable representation, which is an operation of displaying point cloud data corresponding to some layers among one or more layers (or levels) constituting the geometry-decoded and attribute-decoded point cloud data. The scalable representation according to the embodiments may be selectively performed by the reception device when the performance of the display and/or the renderer is lower than that of the point cloud decoder. The level of the scalable representation according to the embodiments corresponds to the depth of the octree structure. As the value of the level according to the embodiments increases, the resolution or detail increases.

Scalable decoding supports reception devices exhibiting various performances and enables point cloud service to be provided even in an adaptive bitrate environment. However, as attribute decoding is performed based on geometry decoding, geometry information is required to perform accurate attribute decoding. For example, a transform coefficient for RAHT coding is determined based on geometry distribution information (or geometry structure information (e.g., an octree structure)). In addition, prediction transform coding and lifting transform coding require entire geometry distribution information (or geometry structure information (e.g., octree structure)) in order to obtain points belonging to each LOD.

Therefore, the reception device may receive and process all geometries in order to perform stable attribute decoding. However, it is inefficient in terms of bitrate to transmit and receive geometry information that is not actually displayed according to the performance of the reception device. In addition, decoding all the geometries by the reception device may cause a delay in providing a point cloud content service. Further, when the decoder of the reception device has low performance, not all geometries may be decoded.

Figure 18:
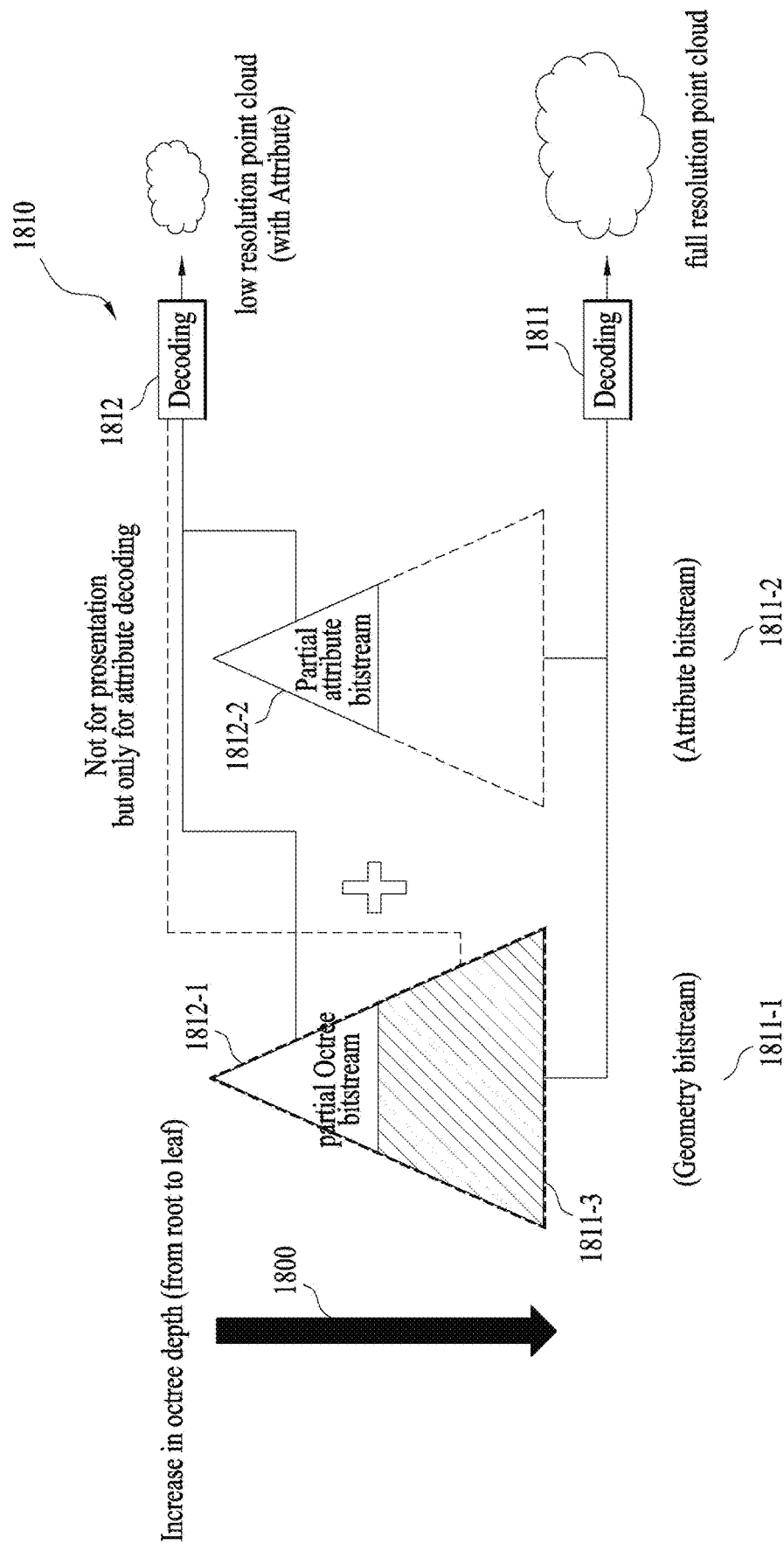
FIG. 18 illustrates scalable representation according to embodiments.

FIG. 18 illustrates scalable representation according to embodiments.

FIG. 18 shows an example 1810 of scalable representation of a point cloud decoder (e.g., the point cloud video decoder 10006 described with reference to FIG. 10 or the point cloud decoder described with reference to FIG. 11) according to embodiments. An arrow 1800 shown in the figure indicates a direction in which the depth of the octree structure of the geometry increases. The highest node of the octree structure according to the embodiments corresponds to the least depth or the first depth, and is referred to as a root. The lowest node of the octree structure according to the embodiments corresponds to the greatest depth or the last depth and is referred to as a leaf. The depth of the octree structure according to the embodiments increases in the direction from the root to the leaf.

The point cloud decoder according to the embodiments performs decoding 1811 for providing full-resolution point cloud content or decoding 1812 for providing low-resolution point cloud content according to performance thereof. In order to provide full-resolution point cloud content, the point cloud decoder decodes a geometry bitstream 1811-1 and an attribute bitstream 1812-1 corresponding to the entire octree structure (1811). To provide low-resolution point cloud content, the point cloud decoder decodes a partial geometry bitstream 1812-1 and a partial attribute bitstream 1812-2 corresponding to a specific depth of the octree structure (1812). According to the embodiments, attribute decoding is performed based on geometry decoding. Therefore, even when the point cloud decoder is to decode attributes corresponding to the partial attribute bitstream 1812-2, the point cloud decoder should decode the entire geometry bitstream 1811-1 (from the root depth to the leaf depth). In other words, in the figure, the shaded portion 1811-3 corresponds to the geometry information that is not displayed, but is transmitted and decoded to decode an attribute corresponding to the partial attribute bitstream 1812-1.

Also, the transmission device (e.g., the transmission device 10000 described with reference to FIG. 1 or the transmission device described with reference to FIG. 12) or the point cloud encoder (the point cloud video encoder 10002 in FIG. 1, the point cloud encoder in FIG. 4, the point cloud encoder described with reference to FIGS. 12, 14, and 15) according to embodiments may transmit only the partial geometry bitstream 1812-1 and the partial attribute bitstream 1812-2, which corresponding to a specific depth of the octree structure. The point cloud decoder to provide low-resolution point cloud content decodes the partial geometry bitstream 1812-1 and the partial attribute bitstream 1812-2 corresponding to the specific depth of the octree structure (1812).

Therefore, as shown in FIG. 18, in order for the reception device to provide point cloud data of various resolutions, that is, to provide scalable representation, a processing process and signaling information for processing a part of the geometry bitstream 1811-1 and the attribute bitstream 1812-1 are needed.

The point cloud encoder according to the embodiments generates a colorized octree by matching attributes to a geometric structure. The colorized octree according to the embodiments is generated by matching a node and an attribute of each level among one or more levels (or depths) representing the octree structure of the geometry.

The point cloud encoder according to the embodiments performs attribute encoding based on the generated colorized octree. In addition, the point cloud encoder generates scalable representation information including information related to the colorized octree to allow the reception device to perform scalable decoding and scalable representation. The generated information is transmitted together with the encoded geometry and encoded attribute over the bitstream.

The reception device may generate a colorized octree based on the scalable representation information as a reverse process of the operation of the transmission device or the point cloud encoder. As described above, the colorized octree represents an attribute matched with the octree structure of the geometry. Accordingly, the reception device may select a specific level based on the colorized octree and output or render low-resolution point cloud content according to the matched attribute. In particular, the reception device may provide point cloud content of various resolutions according to the performance of the reception device without a separate reception process or processing process. Both the transmission device (or the point cloud encoder) and the reception device (or the point cloud decoder) according to the embodiments may generate a colorized octree. The process or method for generating a colorized octree according to the embodiments may be referred to as octree colorization. The point cloud encoder according to the embodiments may perform octree colorization on the entire octree structure from the highest node (lowest level) to the lowest node (highest level) of the octree structure. In addition, the point cloud encoder according to the embodiments may perform octree colorization on any depth section (e.g., a section from level n−1 to level n) of the octree structure. The point cloud decoder according to the embodiments may perform the octree colorization based on the above-described scalable coding information.

Figure 19:
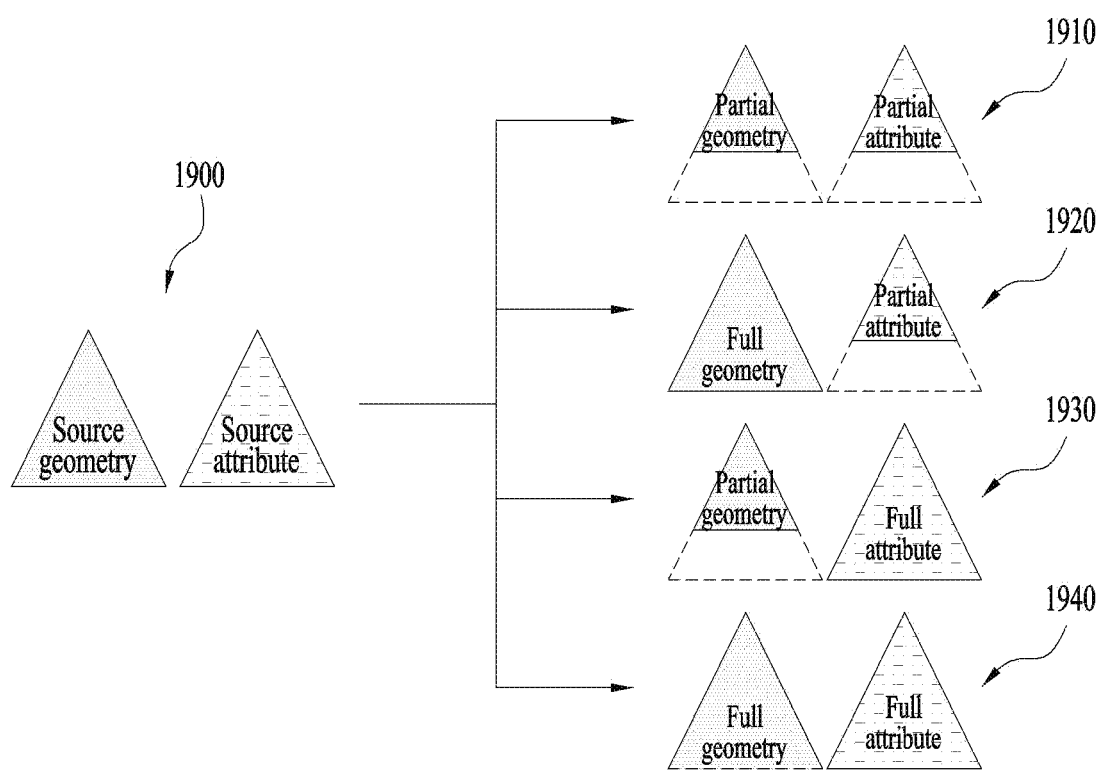
FIG. 19 illustrates colorized octree-based point cloud data according to embodiments.

FIG. 19 illustrates colorized octree-based point cloud data according to embodiments.

As described with reference to FIG. 18, the point cloud encoder according to the embodiments (e.g., the point cloud video encoder 10002 of FIG. 1, the point cloud encoder of FIG. 4, the point cloud encoder described with reference to FIGS. 12, 14 and 15, etc.)) or the transmission device (e.g., the transmission device 10000 described with reference to FIG. 1 or the transmission device described with reference to FIG. 12) may perform geometry encoding and attribute encoding on the point cloud data (called source geometry and source attributes, or geometry and attributes) to enable scalable representation (1900). The encoded geometry and encoded attributes according to the embodiments are transmitted in a bitstream (e.g., the bitstream described with reference to FIG. 1).

According to embodiments, partial geometry and partial attribute of the same level may be transmitted (1910), or full geometry and partial attribute may be transmitted (1920). In addition, the partial geometry and full attribute may be transmitted (1930), or the full geometry and full attribute may be transmitted (1940). As described above, the scalable representation information is transmitted together with the encoded geometry and encoded attribute in a bitstream.

Accordingly, the reception device (e.g., the reception device 10004 of FIG. 1, the point cloud decoder of FIGS. 10 and 11, or the reception device of FIG. 13) according to the embodiments receives the bitstream and secures the scalable representation information. The reception device may provide point cloud data of various resolutions by processing the full or partial geometry and/or attribute in the bitstream based on the scalable representation information (scalable representation).

Figure 20:
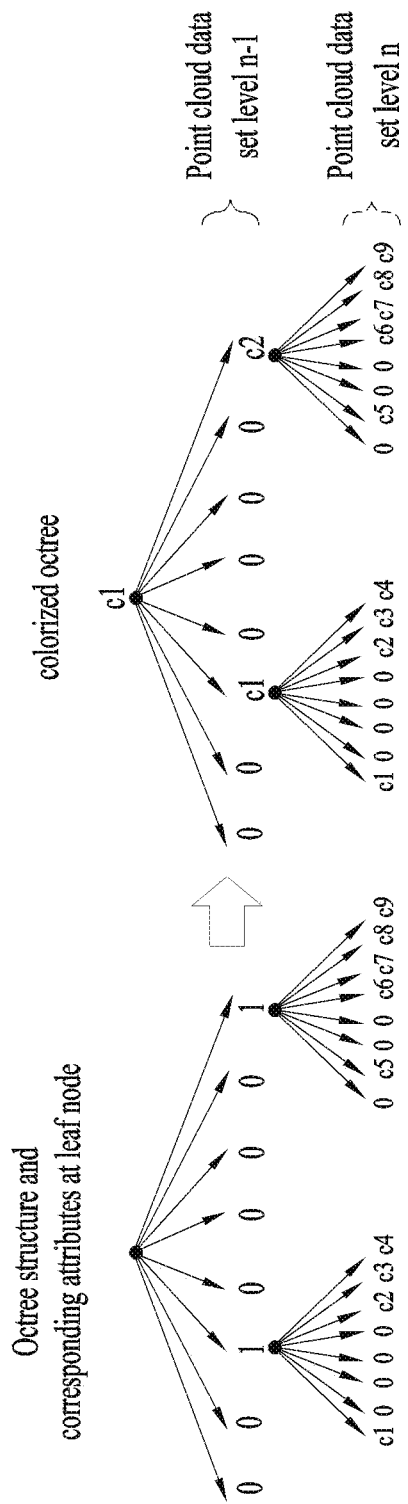
FIG. 20 illustrates a colorized octree according to embodiments.

FIG. 20 illustrates a colorized octree according to embodiments.

The point cloud encoder according to the embodiments (e.g., the point cloud video encoder 10002 of FIG. 1, the point cloud encoder of FIG. 4, or the point cloud encoder described with reference to FIGS. 12, 14 and 15) may perform attribute encoding of encoding an attribute and output an attribute bitstream. The point cloud encoder performs attribute encoding based on the structure of the geometry. That is, the point cloud encoder (e.g., the attribute transform unit 40007 described with reference to FIG. 4) according to the embodiments may transform the attribute based on the geometry structure (or the reconstructed geometry structure). The geometry structure includes an octree structure. Since the octree structure according to the embodiments is a structure representing a three-dimensional space, it does not represent an attribute for each node. In addition, each node has a position (or position information) based on positions of points included in the 3D space corresponding to each node. The position of a node according to the embodiments may be a mean position of the positions of the points included in a region corresponding to the node, a position corresponding to a certain vertex, a preset representative position, an average of the positions of the points included in the region corresponding to the node, or the like. Accordingly, the position of the node represents a position approximate to the actual position information about the points. Details of the octree structure according to the embodiments are the same as those described with reference to FIGS. 1 to 19, and thus a description thereof will be omitted.

The left part in FIG. 20 shows attributes c1, c2, c3, and c4 corresponding to four leaf nodes of a geometry octree structure according to embodiments, respectively. As described above, a leaf node corresponds to the greatest depth or highest level (e.g., level n) of the octree structure. The point cloud encoder according to the embodiments matches each leaf node with an attribute.

The right part in FIG. 20 shows an exemplary colorized octree generated based on attributes corresponding to the leaf nodes of the octree structure. The point cloud encoder according to the embodiments may generate a colorized octree structure representing attributes matched with a lower depth or lower level (e.g., level n−1) of the octree structure, that is, an higher node based on the attributes (of, for example, level n) corresponding to the leaf nodes. The point cloud encoder according to the embodiments matches a position of an octree node with an attribute or a predicted value of the attribute, or matches point cloud data with an octree node. The colorized octree structure according to the embodiments represents attributes matched with a root node corresponding to the lowest level (e.g., level 0). As described with reference to FIGS. 18 and 19, the point cloud encoder according to the embodiments transmits signaling information (e.g., the scalable representation information described with reference to FIG. 18) related to generation of the colorized octree structure and the octree structure together with the encoded geometry and attributes. Therefore, the reception device or the point cloud decoder performs scalable decoding (e.g., the scalable decoding described with reference to FIGS. 18 and 19) up to a specific level (e.g., level I or the highest level n) according to decoding performance based on the signaling information to provide point cloud content of various resolutions.

Figure 21:
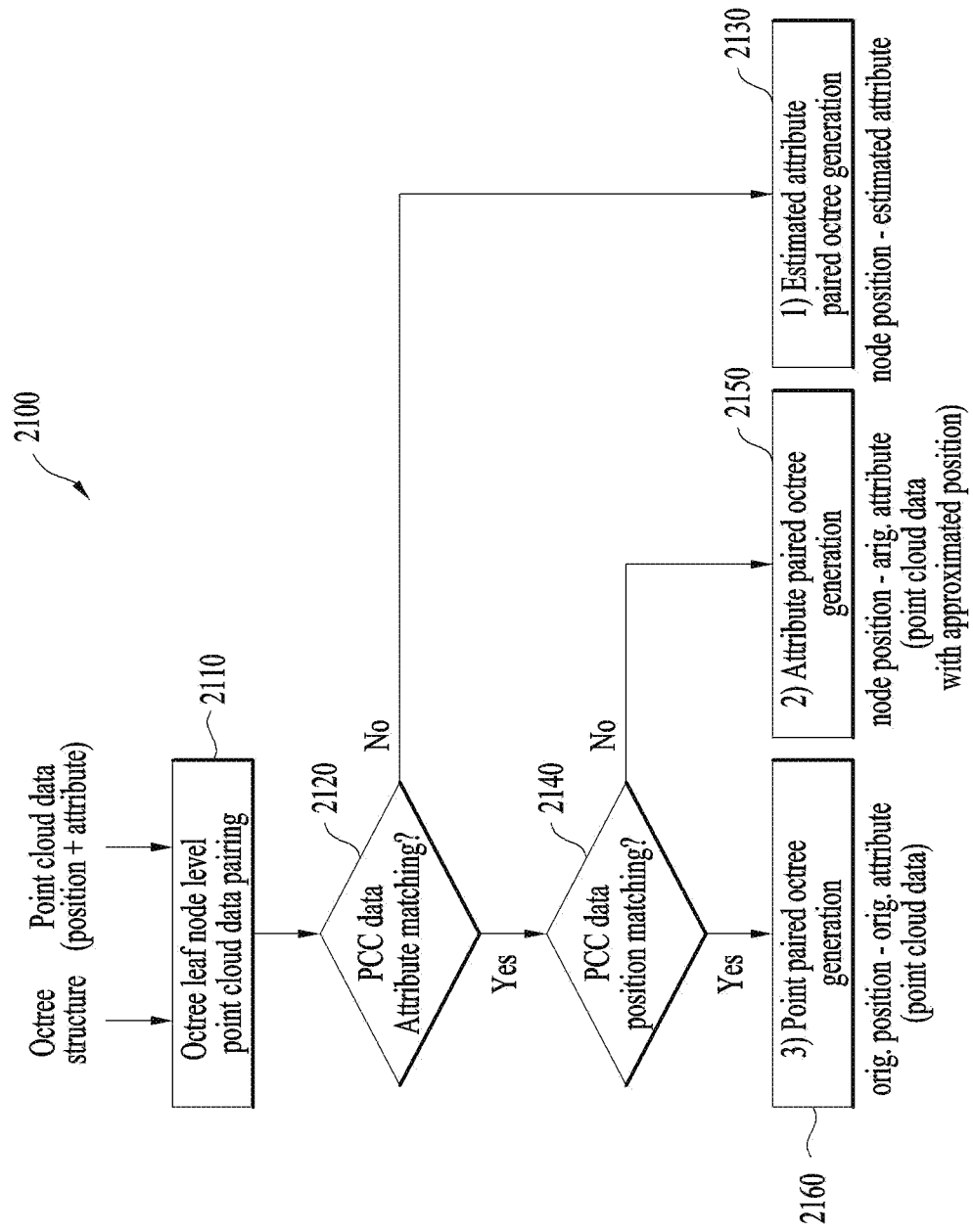
FIG. 21 is an exemplary flowchart of attribute coding according to embodiments.

FIG. 21 is an exemplary flowchart of attribute coding according to embodiments.

The point cloud encoder according to the embodiments may perform attribute coding by generating the colorized octree structure described with reference to FIG. 20. The flowchart shown in FIG. 21 is an example 2100 of the process (or octree colorization) of generating the colorized octree structure described with reference to FIG. 20.

The point cloud encoder according to the embodiments matches leaf nodes of an octree structure (e.g., the octree structure described with reference to FIGS. 1 to 20) with and attributes (2110). The leaf node according to the embodiments corresponds to the highest level of the octree structure. The number of leaf nodes is an integer greater than or equal to 1. The point cloud encoder according to the embodiments matches an attribute with an upper node (ie, a lower level) of the leaf node based on the attribute matched with the leaf node. According to the embodiments, each node has a position (or position information). As described with reference to FIG. 6, a node of the octree structure corresponds to a space in which a 3D space is divided according to the level of the octree structure, and has a position set based on the positions of the points included in each space. The point cloud encoder may match an attribute with each node (2120). When each node is not matched with an attribute, the point cloud encoder generates an estimated attribute based on attributes of a higher level (e.g., attributes of a leaf node), and matches the same with the node of a corresponding level (e.g., the lower level than the level of the leaf node) to generate a colorized octree structure (2130). The point cloud encoder may repeat the same process up to the root node level.

In matching an attribute with each node, the point cloud encoder may match the position of the node or the position of the actual point cloud data with the attribute (2140). The point cloud encoder generates a colorized octree structure by matching the positions of the respective nodes with the attributes (2150). For example, the point cloud encoder may match an attribute of any one child node among one or more child nodes of each node with the node. The point cloud encoder may repeat the same process up to the root node level.

The point cloud encoder generates a colorized octree structure by matching the actual point cloud data with a node (2160). A leaf node according to embodiments corresponds to a voxel, which is the smallest partition unit. Accordingly, the leaf node includes at least one point. Therefore, the position of the leaf node coincides with the position of the corresponding point. However, in the octree structure, positions of nodes other than the leaf node may not exactly coincide with the positions of one or more points positioned in a 3D space corresponding to an actual node. Accordingly, for one or more child nodes of each node, the point cloud encoder may select a pair of the position of a child node and an attribute and match the same with the node, or may select either the average or the mean of the positions of the child nodes, and match the selected value and the attribute of a child node having the position closest to the selected value with the node.

The signaling information related to the process of generating a colorized octree structure shown in FIG. 21 is carried in related signaling information to allow the reception device described with reference to FIG. 18 to perform scalable representation. Accordingly, the reception device or the point cloud decoder performs scalable decoding and scalable representation (e.g., the scalable representation described with reference to FIGS. 18 and 19) up to a specific level (e.g., level I or the highest level n) according to decoding performance based on the signaling information to provide point cloud content of various resolutions.

Figure 22:
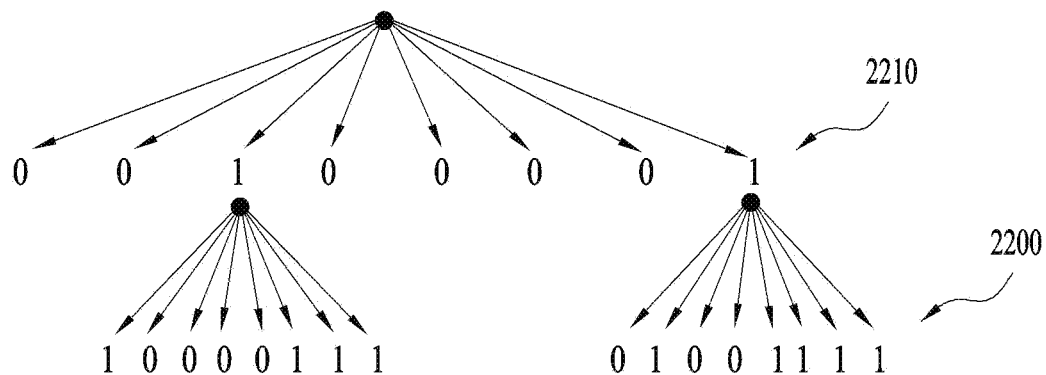
FIG. 22 shows an octree structure according to embodiments.

FIG. 22 shows an octree structure according to embodiments.

As described with reference to FIG. 6, the three-dimensional space of the point cloud content is represented by axes of a coordinate system (e.g., X-axis, Y-axis, and Z-axis). The octree structure is generated by recursive subdividing of a bounding box (or a cubical axis-aligned bounding box). This division method is applied until a leaf node of the octree becomes a voxel. The level rises from the highest node to a leaf node in the octree structure, which is the lowest node, and each leaf node corresponds to a voxel.

The example of FIG. 22 shows a three-level octree structure representing a point cloud. Each node in the octree structure has a position represented as a coordinate value in a three-dimensional coordinate system. As described above, each leaf node has a position of an actual point. Accordingly, in the octree structure shown in the figure, leaf nodes 2200 corresponding to level 3, which is the highest level, have positions represented as (0, 2, 0), (1, 2, 0), (0, 3, 0), (1, 3, 0), (3, 2, 2), (2, 2, 1), (3, 2, 3), (2, 3, 3), and (3, 3, 3). That is, each leaf node may include a point located at each position.

Two occupied nodes (00100001) 2210 corresponding to level 2 of the octree structure have positions represented as (0, 1, 0) and (1, 1, 1), respectively.

Figure 23:
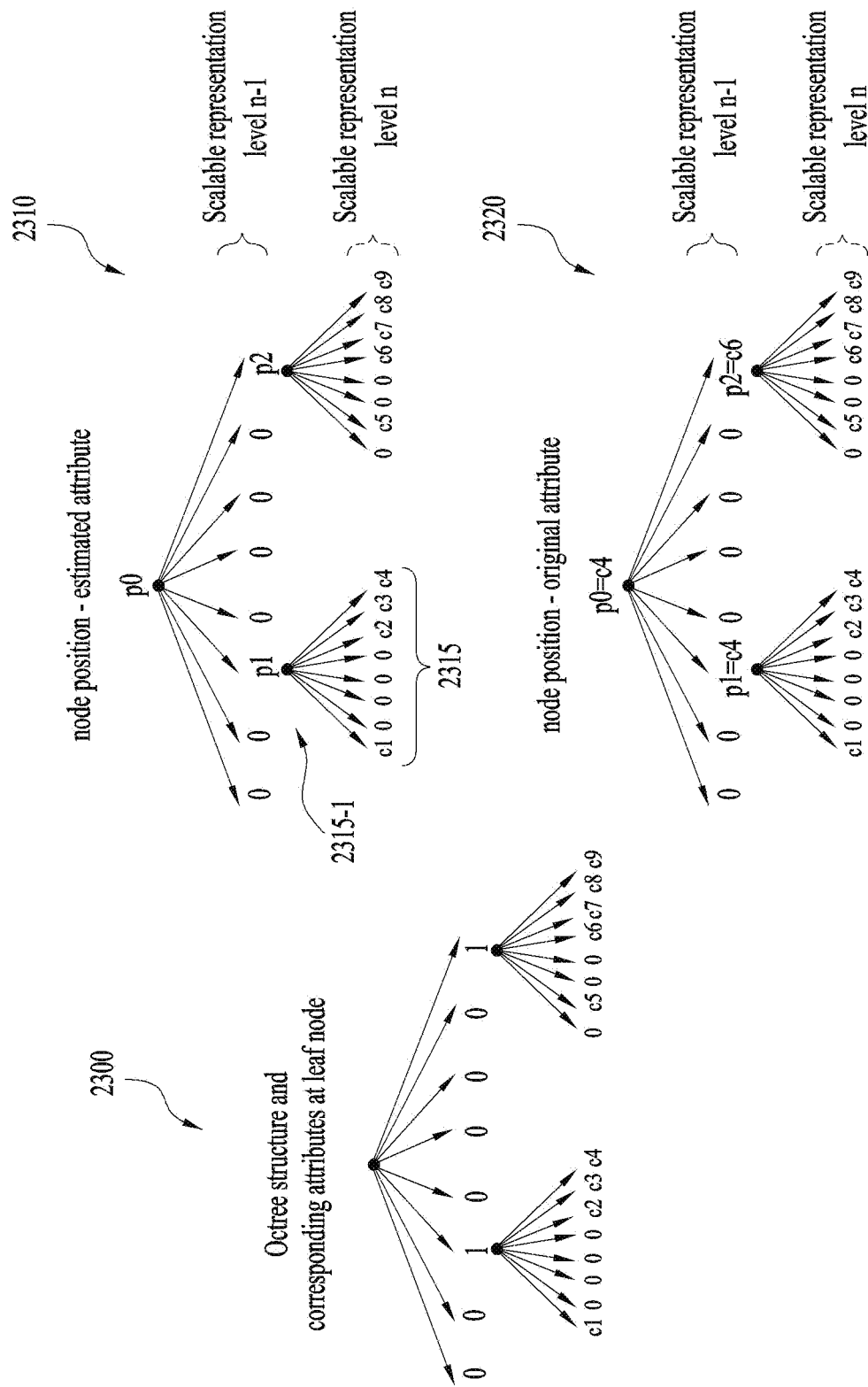
FIG. 23 illustrates a colorized octree structure according to embodiments.

FIG. 23 illustrates a colorized octree structure according to embodiments.

Examples 2300, 2310, and 2320 of FIG. 23 show examples of a colorized octree structure generated based on the three-level octree structure described with reference to FIG. 22.

The example 2300 of FIG. 23 shows attributes matched with leaf nodes of the octree structure (e.g., the octree structure described with reference to FIGS. 1 to 20). The example 2300 of FIG. 23 corresponds to the operation (e.g., 2110) in which the point cloud encoder described with reference to FIG. 21 matches leaf nodes with attributes.

As described above, since a leaf node corresponds to a voxel, the position of each leaf node is the same as the position of an actual point. That is, the positions of the leaf nodes are represented as coordinate values (0, 2, 0), (1, 2, 0), (0, 3, 0), (1, 3, 0), (3, 2, 2), (2, 2, 1), (3, 2, 3), (2, 3, 3), and (3, 3, 3), respectively. Each coordinate value is a position of a point in three-dimensional space. Each leaf node is matched with the attribute of the point of the corresponding position. In the figure, c1, c2, c3, c4, c5, c6, c7, c8, and c9 represent attributes of respective points. The example 2300 of FIG. 23 shows one point (e.g., a point positioned at (0, 2, 0)) having an attribute (e.g., c1). The relationship between attributes and points according to embodiments is not limited to this example. The attribute value of the position (x, y, z) is represented as Attr(x, y, z). Therefore, the attribute values matched with the occupied leaf nodes among the 16 leaf nodes are expressed as follows.

$c1 = Attr(0, 2, 0), c2 = Attr(1, 2, 0),$
$c3 = Attr(0, 3, 0), c4 = Attr(1, 3, 0),$
$c5 = Attr(3, 2, 2), c6 = Attr(2, 2, 1),$
$c7 = Attr(3, 2, 3), c8 = Attr(2, 3, 3), c9 = Attr(3, 3, 3)$ A region corresponding to the upper node (parent node) of the octree leaf node is 8 times larger (2 times greater in each of width, length, and height) than a region corresponding to the leaf node. The size of the region corresponding to an upper node in the octree structure according to the embodiments is expressed as 8^ (octree level difference from the leaf node).

The region corresponding to the upper node according to the embodiments includes one or more points. The position of the upper node according to the embodiments may be set or represented as an average or an average position of the positions of child nodes of the node. Accordingly, the position of the upper node may not match the positions of points in the region corresponding to the upper node. In other words, since there is no actual point corresponding to the upper node position, the point cloud encoder cannot match an attribute corresponding to the upper node position. Therefore, the point cloud encoder (the point cloud video encoder 10002 of FIG. 1, the point cloud encoder of FIG. 4, or the point cloud encoder described with reference to FIGS. 12, 14, and 15) according to the embodiments may match any attribute with the node. The point cloud encoder according to the embodiments may detect neighbor nodes and match the same with any attribute. The neighbor nodes according to the embodiments correspond to occupied nodes among the child nodes of the node.

The point cloud encoder according to the embodiments matches any attribute with upper nodes (e.g., nodes corresponding to level n−1) of the leaf node (e.g., level n) based on the attribute of the leaf node. The point cloud encoder generates a colorized octree by repeating the same process until the highest node is reached. The colorized octree according to the embodiments is referred to as an attribute paired octree.

An example 2310 in the upper right part of FIG. 23 is a colorized octree indicating an estimated attribute matched with an upper node. As described above, the point cloud encoder according to the embodiments defines the position of a node of the octree and matches the same with an estimated attribute to allow the reception device to perform operations such as scalable coding, point cloud subsampling, and provision of low-resolution point cloud content.

In the octree according to the embodiments, the position of a node may be represented as a Morton code position or a position of a three-dimensional coordinate system corresponding to each node. The point cloud encoder may express the attribute of an upper node higher than the leaf node with an estimated attribute that is a value (e.g., a weighted average, a mean, etc.) that may represent the attributes of the child nodes of the node. That is, the position and attribute of a node according to the embodiments may not be the same as the position and attribute of actual point cloud data included in a region corresponding to each node. However, the reception device may provide various versions of point cloud content (e.g., low-resolution point cloud content or approximate point cloud content) according to the decoding performance or the network environment, based on the above-described colorized octree structure.

In the figure, p0 represents the estimated attribute matched with the highest node (level 1), and p1 and p2 represent estimated attributes matched with an upper node. The point cloud encoder according to the embodiments may calculate p1 2315-1 based on attributes c1, c2, c3 and c4 of the child nodes 2315.

The following equation represents the estimated attribute (p(x,y,z)) of an upper node having the position value (x, y, z).

[Equation 1]
$$p(x, y, z) = \\ f_{(x_n, y_n, z_n) \in NEIGHB_{(x,y,z)}}\{Attr(x_n, y_n, z_n)\} = \frac{1}{N}\sum_{i,j,k=0}^{1} \\ w(i, j, k) \times Attr(2 \times \lfloor x/2 \rfloor + i, 2 \times \lfloor y/2 \rfloor + j, 2 \times \lfloor z/2 \rfloor + k$$

In the equation, Attr(xn,yn,yn) denotes the attribute of a child node of the node. W denotes a weight for neighbor nodes, and i, j, and k are parameters used to define the positions of the neighbor nodes with respect to the upper node position (x, y, z). N denotes the number of the neighbor nodes.

An example 2320 in the lower right part of FIG. 23 is a colorized octree indicating attributes matched with an upper node. The point cloud encoder according to the embodiments may select one of the attributes of the child nodes of a node (e.g., the attribute of the first child node among the child nodes sorted in ascending order) in order to define the attribute of the parent node of the leaf node. Since the upper node according to the embodiments has a node position and an actual attribute, the reception device may provide more approximate point cloud content (low-resolution point cloud content) even when scalable decoding is performed. In the figure, p0 denotes an estimated attribute matched with the highest node (level 1), and p1 and p2 denote attributes matched with the upper node. As shown in the figure, p1 is equal to c4 among the attributes of the child nodes, and p2 is equal to c6 among the attributes of the child nodes. The attribute p0 matched with the top node is equal to c4 among the lower attributes.

The following equation represents the estimated attribute p(x,y,z) matched with the upper node having the position values of (x, y, z).

[Equation 2]
$$p(x, y, z) = f_{(x_n,y_n,z_n) \in NEIGHB(x,y,z)}\{Attr(x_n, y_n, z_n)\} = \mathrm{argmin}_{C_p} \left\{ \frac{1}{M} \sum_{(x_n,y_n,z_n) \in NEIGHB(x,y,z)} \|c_p - Attr(x_n, y_n, z_n)\|^2 \right\}$$

In the equation above, Cp denotes an attribute (e.g., a color value) matched with an occupied node among the child nodes. Attr(xn,yn,yn) denotes an attribute of a neighbor node around the node. M denotes the sum of weights for the neighbor nodes. That is, the equation is used to determine an attribute Cp that minimizes a difference from a neighbor node as an estimated attribute (i.e., a predicted value) matched with the upper node.

Figure 24:
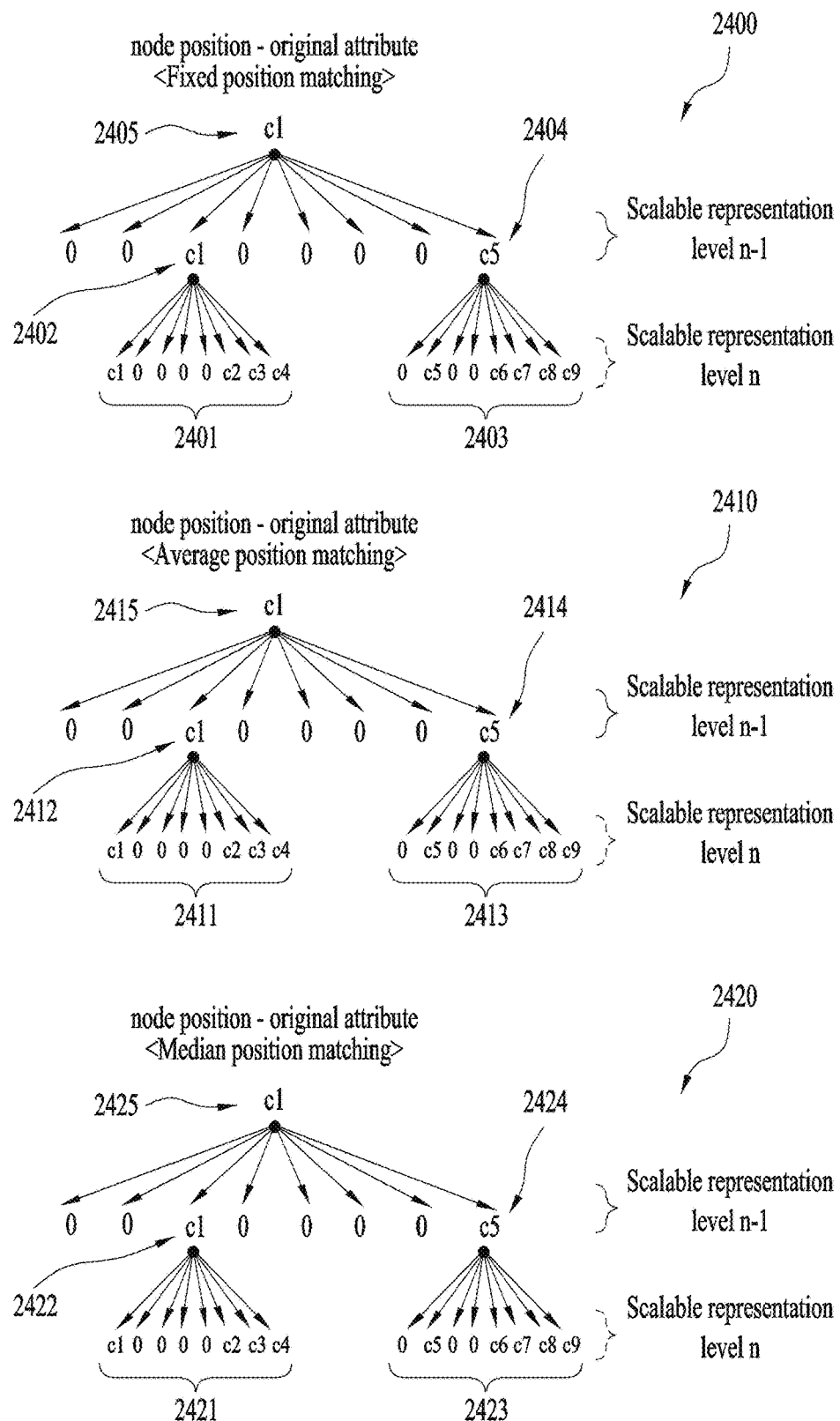
FIG. 24 illustrates a colorized octree structure according to embodiments.

FIG. 24 illustrates a colorized octree structure according to embodiments.

Examples 2400, 2410, and 2420 shown in FIG. 24 are examples of a colorized octree structure generated based on the example 2300 of the three-level octree structure having leaf nodes matched with attributes described with reference to FIG. 22. As described with reference to FIGS. 22 and 23, each node (excluding leaf nodes) in the octree structure has a position. The position of each node may not be the same as the positions of points included in the region corresponding to the node. The point cloud encoder according to embodiments may generate a colorized octree structure by matching not only the attributes described with reference to FIG. 23 but also positions for the nodes of the octree structure. That is, an actual point is matched with a node of the colorized octree according to the embodiments. The colorized octree according to the embodiments is referred to as a point paired octree. Accordingly, the reception device may provide point cloud content close to the original based on the colorized octree even when it performs scalable decoding.

In order to match an actual point with an upper node (excluding leaf nodes) in the octree structure, the point cloud encoder (the point cloud video encoder 10002 of FIG. 1, the point cloud encoder of FIG. 4, the point cloud encoder described with reference to FIGS. 12, 14, and 15, or the like) according to the embodiments may select point cloud data close to the position of the node. For example, as the position of the node, the point cloud encoder may select a position of a node having a minimum distance from a neighbor node. Also, the point cloud encoder may match an attribute corresponding to a geometric centroid with the node. The geometric centroid according to the embodiments corresponds to a point at which the distance from all neighbor nodes (e.g., nodes of the same level and/or child nodes of the node) around the octree node is minimized. The equation given below represents an attribute of the geometric centroid matched with a node having a position of (x, y, z).

[Equation 3]
$$p_{GeoCtr}(x, y, z) = f_{(x_n,y_n,z_n) \in NEIGHB(x,y,z)}\{Attr(x_n, y_n, z_n)\} = \mathrm{argmin}_{Attr(x_n,y_n,z_n)} \left\{ \frac{1}{M} \sum_{\substack{(x_n,y_n,z_n) \in NEIGHB(x,y,z) \\ (x_p,y_p,z_p) \in NEIGHB(x,y,z)}} \|[x_p, y_p, z_p]^T - [x_n, y_n, z_n]^T\|^2 \right\}$$

(x_p, y_p, z_p) denotes the position of a node having a minimum distance from the neighbor nodes. (x_n, y_n, z_n) denotes neighbor nodes. Neighbor nodes according to embodiments include nodes at the same level as the node and/or child nodes. (x_p, y_p, z_p) and (x_n, y_n, z_n) are included in the set of peripheral nodes (or neighbor nodes, (NEIGHB(x,y,z)) around the node having the value of (x,y,z). Attr(xn,yn,yn) denotes the attribute of a neighbor node around the node. M denotes the sum of weights for peripheral nodes (or neighbor nodes). That is, the equation above is used to determine the attribute of the geometric centroid that minimizes the difference in distance from the peripheral nodes as an estimated attribute (i.e., predicted value) matched with the upper node.

The example 2400 shown at the top of FIG. 24 is a colorized octree in which the position and attribute of any one of the child nodes are matched with the upper node. The point cloud encoder according to the embodiments selects a position corresponding to the geometric centroid as a position of the upper node (e.g., the upper node of a leaf node, etc.). For the position corresponding to the geometric centroid according to the embodiments, point cloud data of a specific node among the child nodes of the node arranged in fixed order (e.g., the first node among the child nodes arranged in ascending order) may be selected.

As shown in the example 2400, leaf nodes 2401 have attributes c1, c2, c3, and c4, respectively. The point cloud encoder according to the embodiments matches the position and attribute c1 of the first child node with the parent node 2402 of the leaf nodes 2401. Leaf nodes 2403 have attributes c5, c6, c7, c8, and c9, respectively. Accordingly, the point cloud encoder matches the position and attribute c5 of the first child node with the parent node 2404 of the leaf nodes 2403.

In the same manner, the point cloud encoder matches the highest node 2405 with the position and attribute c1 of the first node 2402 between among the child nodes 2402 and 2404 of the node.

Therefore, the point of a child node matched with the parent node is represented as an equation given below.

[Equation 4]
$$[x_p, y_P, z_p]^T = [x_k, y_k, z_k]^T$$

where $[x_k, y_k, z_k]^T$ represent the k-th point in NEIGHBOR in the ascending order In the equation, (x_p, y_p, z_p) is a position for obtaining the above-described geometric centroid, and (x_k, y_k, z_k) denotes a point matched with a child node corresponding to a fixed sequential position k.

The point cloud encoder according to the embodiments calculates the average position of the positions of the occupied nodes among the child nodes, and matches the point data (or points) of a child node whose position closest to the average position with the upper node to generate a colorized octree.

The equation given below represents a method of calculating an average position of the positions of occupied nodes among the child nodes.

$$[x_p, y_p, z_p]^T = \frac{1}{M} \sum_{(x_n, y_n, z_n) \in NEIGHB(x,y,z)} \text{weight}(x_n, y_n, z_n \mid x, y, z) \cdot [x_n, y_n, z_n]^T \quad \text{[Equation 5]}$$

In the equation, (x_p, y_p, z_p) denotes the position of the parent node, and weight denotes a weight value, which may indicate occupancy of the child node (e.g., weight is set to 1 for occupied nodes, and set to 0 for unoccupied nodes), or may indicate a weight for a specific direction. NEIGHBOR denotes neighbor nodes, that is, child nodes of a parent node. M denotes the sum of the weights.

The example 2410 shown in FIG. 24 is a colorized octree obtained by calculating the average position of the positions of occupied nodes among the child nodes and matching the position and attribute of a child node whose position is closest to the average position with the upper node thereof.

As shown in the example 2410, leaf nodes 2411 have attributes c1, c2, c3, and c4, respectively. The point cloud encoder according to the embodiments calculates a mean of the positions of the leaf nodes 2411. The positions and attributes of the leaf nodes 2411 according to the embodiments are represented as follows.

$$c1 = Attr(0, 2, 0), c2 = Attr(1, 2, 0), c3 = Attr(0, 3, 0), c4 = Attr(1, 3, 0)$$

The mean of the positions of the leaf nodes 2411 according to the embodiments is expressed as follows.

$$\text{Mean} = (0.4, 2, 0)$$

Therefore, since the position closest to the average value is c1, the point cloud encoder according to the embodiments matches the position and attribute of c1 with the parent node 2412 (e.g., a node of level n−1) of the leaf nodes 2411.

Leaf nodes 2413 have c5, c6, c7, c8, and c9 attributes, respectively. A point cloud encoder according to embodiments calculates a mean of the positions of the leaf nodes 2413. The positions and attributes of the leaf nodes 2413 according to the embodiments are represented as follows.

$$c5 = Attr(3, 2, 2), c6 = Attr(2, 2, 1),$$
$$c7 = Attr(3, 2, 3), c8 = Attr(2, 3, 3), c9 = Attr(3, 3, 3)$$

The mean of the positions of the leaf nodes 2413 according to the embodiments is represented as follows.

$$\text{Mean} = (2.6, 2.4, 2.4)$$

The position closest to the average is c5, and therefore the point cloud encoder according to the embodiments matches the position of c5 and attribute with the parent node 2414 (e.g., the node of level n−1) of the leaf nodes 2413.

In the same way, the point cloud encoder calculates the average position of the positions of the nodes 2412 and 2414 (e.g., the nodes of level n−1). The positions and attributes of the nodes 2412 and 2414 according to the embodiments are given as follows.

$$c1 = Attr(0, 2, 0), c5 = Attr(3, 2, 2)$$

The average position of the positions of the node 2412 and the node 2414 according to the embodiments is represented as follows.

$$\text{Mean} = (1.5, 2, 1)$$

The position closest to the average is c1, and therefore the point cloud encoder according to the embodiments matches the position of c1 and attribute with the parent node 2415 (e.g., the highest level node) of the node 2412 and the node 2414.

The point cloud encoder according to the embodiments calculates a median position of the positions of occupied nodes among the child nodes, matches the position and attribute of a child node whose position is closest to the median position with the upper node to generate a colorized octree. The median position according to the embodiments may represent a mean value in Morton code order. Also, when the number of occupied nodes is an even number, the point cloud encoder according to the embodiments may calculate the median position.

The equation given below represents a method of calculating the median position of the positions of occupied nodes among the child nodes.

$$[x_p, y_p, z_p]^T = \text{MEDIAN}_{NEIGHB(x,y,z)}\{\text{weight}(x_n, y_n, z_n \mid x, y, z) \cdot [x_n, y_n, z_n]^T\} \quad \text{[Equation 6]}$$

In the equation, (x_p, y_p, z_p) denotes the position of the parent node, and weight denotes a weight value, which may indicate occupancy of the child node (e.g., weight is set to 1 for occupied nodes, and set to 0 for unoccupied nodes), or may indicate a weight for a specific direction. NEIGHBOR denotes neighbor nodes, that is, child nodes of a parent node.

The example 2420 shown in FIG. 24 is a colorized octree obtained by calculating the median position of the positions of occupied nodes among the child nodes and matching the position and attribute of a child node whose position is closest to the median position with the upper node.

As shown in the example 2420, leaf nodes 2421 have attributes c1, c2, c3, and c4, respectively. The point cloud encoder according to the embodiments calculates a median position of the positions of the leaf nodes 2421. The position closest to the median position is node c2, and accordingly the point cloud encoder according to the embodiments matches the position and attribute of c2 with the parent node 2422 (e.g., the node of level n−1) of the leaf nodes 2421.

The leaf nodes 2423 have attributes c5, c6, c7, c8, and c9, respectively. The point cloud encoder according to the embodiments calculates the median position of the positions of the leaf nodes 2423. The position closest to the median position is the position of node c7, and accordingly the point cloud encoder according to the embodiments matches the position and attribute of c7 with the parent node 2424 (e.g., the node of level n−1) of the leaf nodes 2423.

In the same way, the point cloud encoder computes the median position of the positions of node 2422 and node 2424 (e.g. the nodes of level n−1). Since the position closest to the median position is c2, the point cloud encoder according to the embodiments matches the position and attribute of c2 with the parent node 2425 (e.g., the top-level node) of the node 2422 and the node 2424.

As described with reference to FIG. 23, in order to define the attribute of the upper node higher than the leaf node, the point cloud encoder according to the embodiments may select one of the attributes of child nodes (neighbor nodes) of the node (the example 2320 of FIG. 23). The point cloud encoder according to the embodiments may match the position and attribute of the selected child node. The equation below is an embodiment of the equation corresponding to the example 2320 of FIG. 23.

[Equation 7]

$$p(x, y, z) = f_{(x_n, y_n, z_n) \in NEIGHB(x,y,z)} \{Attr(x_n, y_n, z_n)\}$$

$$= \text{argmin}_{Attr(x_p, y_p, z_p)} \left\{ \frac{1}{M} \sum_{\substack{(x_n, y_n, z_n) \in NEIGHB(x,y,z) \\ (x_p, y_p, z_p) \in NEIGHB(x,y,z)}} \|Attr(x_p, y_p, z_p) - Attr(x_n, y_n, z_n)\|^2 \right\}$$

In the equation, Attr(xp, yp, zp) denotes an attribute of a parent node having a position of (xp, yp, zp), and Attr(xn, yn, zn) denotes an attribute of a neighbor node. M denotes the sum of weights for peripheral nodes (or neighbor nodes). That is, the above equation is used to determine an attribute of a neighbor node having the minimum difference from the attribute of the upper node as an estimated attribute (i.e., a predicted value) matched with the attribute of the upper node.

As described above, a point cloud data transmission device (e.g., the point cloud data transmission device described with reference to FIGS. 1, 12, 14 and 15) may transmit encoded point cloud data in the form of a bitstream 2600. The bitstream 2600 according to the embodiments may include one or more sub-bitstreams.

The point cloud data transmission device (e.g., the point cloud data transmission device described with reference to FIGS. 1, 12, 14 and 15) may divide an image of the point cloud data into one or more packets in consideration of the error of the transmission channel, and transmit the same over the network. According to embodiments, the bitstream 2600 may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device according to the embodiments may perform point cloud compression coding having better compression efficiency and appropriate latency on data corresponding to a region important to a user.

A tile according to embodiments, represents a cuboid in a three-dimensional space (e.g., a bounding box) in which point cloud data is distributed. A slice according to embodiments is a series of syntax elements representing some or all of encoded point cloud data, and represents a set of points that may be independently encoded or decoded. According to embodiments, a slice may include data transmitted through a packet, and may include one geometry data unit and zero or more attribute data units. According to embodiments, a tile may include one or more slices.

The bitstream 2600 according to the embodiments may include signaling information including a sequence parameter set (SPS) for sequence-level signaling, a geometry parameter set (GPS) for signaling of geometry information coding, an attribute parameter set (APS) for signaling of attribute information coding, and a tile parameter set (TPS) for tile-level signaling, and one or more slices.

The SPS according to the embodiments is encoding information about the entire sequence including a profile and a level, and may include comprehensive information about the entire file, such as a picture resolution and a video format.

According to embodiments, one slice (e.g., slice 0 of FIG. 30) includes a slice header and slice data. The slice data may include one geometry bitstream (Geom0$^0$) and one or more attribute bitstreams (Attr0$^0$, Attr1$^0$). The geometry bitstream may include a header (e.g., a geometry slice header) and a payload (e.g., a geometry slice data). The header of the geometry bitstream according to the embodiments may include identification information (geom_geom_parameter-_set_id) for a parameter set included in the GPS, a tile identifier (geom_tile id), a slice identifier (geom_slice_id), and information related to the data included in the payload. The attribute bitstream may include a header (e.g., an attribute slice header or an attribute brick header) and a payload (e.g., attribute slice data or attribute brick data).

As described with reference to FIGS. 18 to 24, the point cloud encoder according to the embodiments may generate a colorized octree and generate scalable representation information including signaling information related to the colorized octree generation. Accordingly, the bitstream includes scalable representation information. In order to perform the scalable representation, the point cloud decoder generates the colorized octree described with reference to FIGS. 18 to 24. Accordingly, the point cloud decoder according to the embodiments acquires scalable representation information included in a bitstream and performs scalable decoding based on the scalable representation information.

The scalable representation information included in the bitstream according to the embodiments may be generated by a metadata processor or transmission processor (e.g., the transmission processor 12012 of FIG. 12) included in the point cloud encoder, an element in the metadata processor or transmission processor, or the attribute coder 1840 described with reference to FIG. 18. The scalable representation information according to the embodiments may be generated based on a result of attribute encoding.

The scalable representation information according to the embodiments may be included in an APS and an attribute slice. In addition, the scalable representation information according to the embodiments may be defined in association with attribute coding (attribute encoding and attribute decoding) or may be defined independently. When defined in association with scalable decoding for attributes and geometry scalable decoding, the scalable representation information may be included in a GPS. When the scalable representation information is applied to one or more point cloud bitstreams or is applied on a tile-by-tile basis, it may be included in an SPS or a tile parameter set. The transmission position of the scalable representation information in the bitstream according to the embodiments is not limited to this example.

FIG. 25 shows an exemplary syntax for an APS according to embodiments.

In FIG. 25, the exemplary syntax for the APS according to the embodiments may include the following information (or fields, parameters, etc.).

aps_attr_parameter_set_id indicates an identifier of an APS for reference by other syntax elements. The value of aps_attr_parameter_set_id shall be in the range of 0 to 15. Since one or more attribute bitstreams are included in the bitstream, a field (e.g., ash_attr_parameter_set_id) having the same value as aps_attr_parameter_set_id may be included in the header of each attribute bitstream.

The point cloud decoder according to the embodiments may secure an APS corresponding to each attribute bitstream based on aps_attr_parameter_set_id and process the corresponding attribute bitstream.

aps_seq_parameter_set_id specifies the value of sps_seq_parameter_set_id for the active SPS. The value of aps_seq_parameter_set_id shall be in the range of 0 to 15.

Scalable coding information 2500 according to embodiments is described below.

scalable_representation_available_flag indicates whether scalable decoding (or scalable representation) is available. As described with reference to FIGS. 18 to 24, the point cloud encoder according to the embodiments may generate a colored octree to enable scalable representation and process attributes based on the colored octree. When scalable_representation_available_flag is equal to 1, scalable_representation_available_flag indicates that decoded point cloud data (decoded attribute) has a structure (colorized octree structure) in which be scalable representation is available. Accordingly, the reception device may generate a colorized octree based on this information to provide scalable representation. When scalable_representation_available_flag is equal to 0, scalable_representation_available_flag indicates that the decoded point cloud data does not have a structure in which scalable representation is available.

octree_colorization_type indicates a colorized octree type or a method of generating a colorized octree. octree_colorization_type equal to 0 indicates that the colorized octree is generated according to the attribute paired octree (e.g., the attribute paired octree described with reference to FIG. 23) or the attribute paired octree generation method. octree_colorization_type equal to 1 indicates that the colorized octree is generated according to the point paired octree (e.g., the point paired octree described with reference to FIG. 24) or the point paired octree generation method.

Related parameters given when octree_colorization_type is equal to 0, that is, when the colorized octree is an attribute paired octree are disclosed below.

Matched_attribute_type indicates the type of an attribute matched with an octree node. When Matched_attribute_type is equal to 0, Matched_attribute_type indicates that the attribute is an estimated attribute (e.g., an attribute estimated based on attributes of neighbor nodes or child nodes). Since the process of calculating the estimated attribute and matching the estimated attribute is the same as or similar to the process described with reference to FIG. 23 (e.g., the example 2310), a detailed description thereof will be omitted. When Matched_attribute_type is equal to 1, Matched_attribute_type indicates that the attribute is an actual attribute (e.g., an attribute of a child node). Since the actual attribute matching process is the same as or similar to the process described with reference to FIG. 23 (e.g., the example 2320), a detailed description thereof will be omitted.

attribute_selection_type indicates a method of matching an attribute with an octree node. When attribute_selection_type is equal to 0, the estimated attribute corresponds to the average of the attributes of the child nodes. When attribute_selection_type is equal to 1, the estimated attribute corresponds to the mean of the attributes of the child nodes. When attribute_selection_type is equal to 2, the attribute corresponds to the attribute of a child node in fixed order (e.g., the attribute of the first child node or the attribute of the second child node among the child nodes sorted in ascending order).

Related parameters given when octree_colorization_type is equal to 1, that is, the colorized octree is a point paired octree are described below.

point_data_selection_type indicates a method or type of selecting point data to be matched with an octree node.

When point_data_selection_type is equal to 0, point_data_selection_type indicates a method of selecting point cloud data (or points) of a node in fixed order among the child nodes of the corresponding node (e.g., the first node in ascending order of the child nodes) (e.g, the example 2400 of FIG. 24). When point_data_selection_type is equal to 1, point_data_selection_type indicates a method of selecting a point of a child node whose position is closest to the average position of the positions of the occupied nodes among the child nodes (e.g., the example 2410 of FIG. 24). When point_data_selection_type is equal to 2, point_data_selection_type indicates a method of selecting a point of a child node whose position is closest to the mean position of the positions of the occupied nodes among the child nodes (e.g., the example 2420 of FIG. 24).

Related parameters given when point_data_selection_type is equal to 0 or 3 are described below. point_cloud_geometry_info_present_flag indicates whether geometry information about point data (or points) matched with an octree node is directly provided. When point_cloud_geometry_info_present_flag is equal to 1, geometry information (e.g., position) about point data (or points) matched with the octree node is transmitted together. When point_cloud_geometry_info_present_flag is equal to 0, geometry information about the point data (or points) matched with the octree node is not transmitted together.

FIG. 26 shows an exemplary syntax for an attribute slice bitstream according to embodiments.

The first syntax 2600 shown in FIG. 26 represents an example of syntax for an attribute slice bitstream according to embodiments. The attribute slice bitstream includes an attribute slice header (attribute_slice_header) and attribute slice data (attribute_slice_data).

The second syntax 2610 shown in FIG. 26 is an example of syntax for an attribute header according to embodiments. The syntax for the attribute header may include the following information (or fields, parameters, etc.).

ash_attr_parameter_set_id has the same value as aps_attr_parameter_set_id of active APSs (e.g., aps_attr_parameter_set_id included in the syntax for the APS described with reference to FIG. 25).

ash_attr_sps_attr_idx identifies an attribute set included in an active SPS. The value of ash_attr_sps_attr_idx falls within the range from 0 to the value of sps_num_attribute_sets included in the active SPS.

The third syntax 2620 shown in FIG. 26 is an example of syntax for attribute slice data according to embodiments. The syntax for attribute slice data may include the following information.

dimension=attribute_dimension[ash_attr_sps_attr_idx] indicates an attribute dimension (attribute_dimension) of a set of attributes identified by ash_attr_sps_attr_idx. The attribute_dimension indicates the number of components constituting the attribute. The attribute according to the embodiments represents reflectance, color, or the like. Therefore, the number of components that an attribute has is different. For example, an attribute corresponding to color may have three color components (e.g., RGB). An attribute corresponding to reflectance may be a mono-dimensional attribute, and an attribute corresponding to color may be a three-dimensional attribute. Attributes according to embodiments may be attribute-encoded on a per dimension basis. For example, the attribute corresponding to reflectance and the attribute corresponding to color may be attribute-encoded, respectively. Attributes according to embodiments may be attribute-encoded regardless of dimensions. For example, the attribute corresponding to reflectance and the attribute corresponding to color may be attribute-encoded together.

When scalable attribute decoding according to the embodiments is applicable for each slice, the syntax for attribute slice data includes a bitstream according to the attribute coding type. An APS according to the embodiments may include attr_coding_type. attr_coding_type indicates an attribute coding type. attr_coding_type is equal to any one of 0, 1, or 2 in bitstreams according to the embodiments. Other values of attr_coding_type may be reserved for further use by ISO/IEC. Accordingly, the point cloud decoder according to the embodiments may ignore the values of attr_coding_type other than 0, 1, and 2. 0 indicates that the attribute coding type is predicting weight lifting transform coding, and 1 indicates that the attribute coding type is RAHT transform coding. 2 indicates that the attribute coding type is fixed weight lifting.

When attr_coding_type is equal to 0, the attribute coding type is predicting weight lifting transform coding. Accordingly, the syntax for attribute slice data includes a PredictingWeight_Lifting bitstream (PredictingWeight_Lifting_bitstream(dimension)).

When attr_coding_type is equal to 1, the attribute coding type is RAHT transform coding. Accordingly, the syntax for attribute slice data includes a RAHT bitstream (RAHT_bitstream(dimension)).

When attr_coding_type (e.g., attr_coding_type described with reference to FIG. 23) is equal to 2, the attribute coding type is fixed predicting weight lifting transform coding. Accordingly, the syntax for attribute slice data includes a FixedWeight_Lifting bitstream (FixedWeight_Lifting_bitstream(dimension)).

Also, as described with reference to FIG. 25, the APS according to the embodiments includes point_cloud_geometry_info_present_flag. When point_cloud_geometry_info_present_flag is equal to 1, the syntax for attribute slice data further includes a colorized octree position bitstream.

A fourth syntax 2630 shown in the figure is an example of syntax for a colorized octree position bitstream. The syntax for the colorized octree position bitstream includes the following parameters.

colorization_start_depth_level indicates a start octree level or octree depth level to which octree colorization for generating a colorized octree is applied. colorization_end_depth_level indicates an end octree level or octree depth level to which octree colorization is applied.

Accordingly, the total number of octree depth levels to which octree colorization is applied is expressed as a value obtained by adding 1 to a difference between a level indicated by colorization_end_depth_level and a level indicated by colorization_start_depth_level.

$$numOctreeDepthLevel = \\ colorization\_end\_depth\_level - colorization\_start\_depth\_level + 1$$

The following is information related to each octree depth level to which octree colorization is applied. num_colorized_nodes[i] indicates the number of nodes to which octree colorization is applied for the i-th octree depth level. i has a value greater than or equal to 0 and less than the number indicated by numOctreeDepthLevel. Each octree depth level ((i+colorization_start_depth_level)-th octree depth level) is equal to the sum of a value indicated by i and a value indicated by colorization_start_depth_level.

position_index [i][j] indicates the position of the j-th node of the (i+colorization_start_depth_level)-th octree level. j denotes the index of each node. j has a value greater than or equal to 0 and less than the value of num_colorized nodes. The position according to the embodiments includes a coordinate value in a three-dimensional coordinate system composed of x, y, and z axes and/or a sequential position of the corresponding point in Morton code order. position_index [i][j] according to the embodiments may be transmitted for each node. When the same information is repeated in the full octree structure or the corresponding octree level as in the method (e.g., the example 2400 of FIG. 24) of selecting point cloud data (or points) of a node among the child nodes of the node in fixed order (e.g., the first node in ascending order of the child nodes) according to point_data_selection_type, position_index [i][j] according to embodiments may be transmitted or the transmission position thereof may be changed (e.g. syntax may be changed) only at the repeating time.

Figure 27:
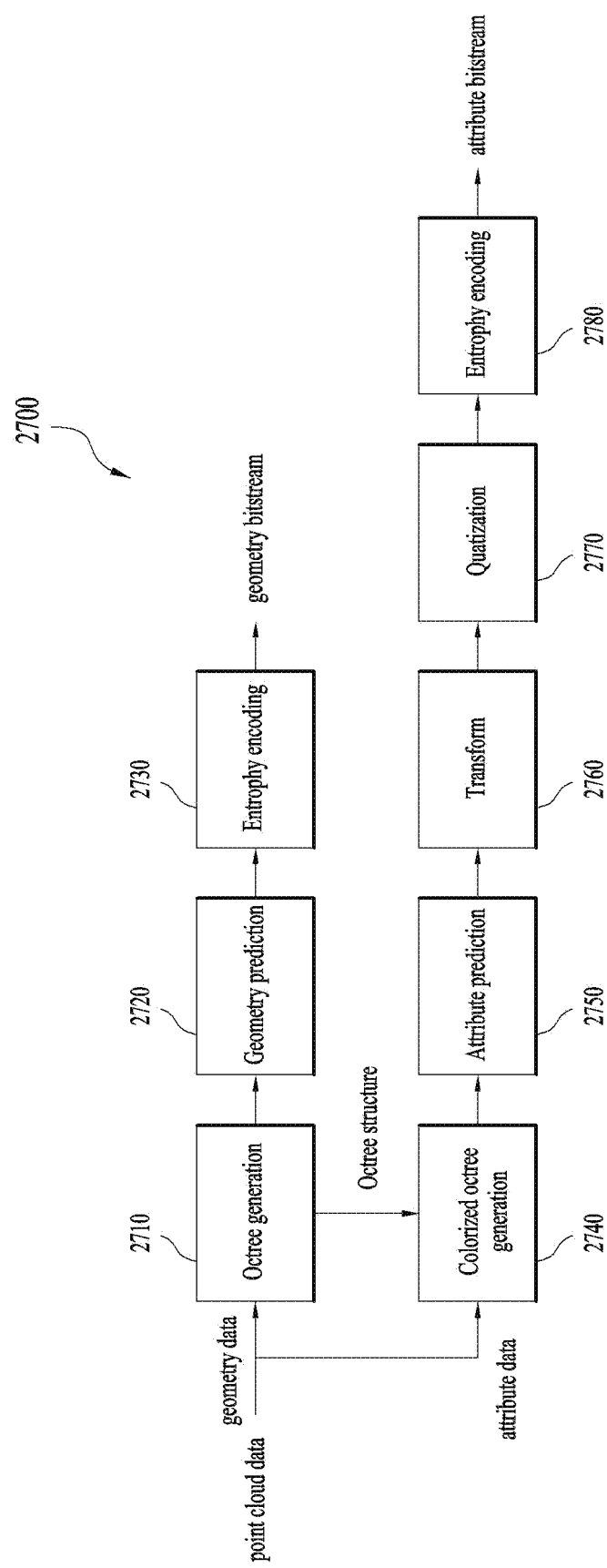
FIG. 27 is a block diagram illustrating an encoding operation of a point cloud encoder.

FIG. 27 is a block diagram illustrating an encoding operation of a point cloud encoder.

A point cloud encoder 2700 according to the embodiments (e.g., the point cloud video encoder 10002 of FIG. 1, the point cloud encoder of FIG. 4, the point cloud encoder described with reference to FIGS. 12, 14 and 15) may perform the encoding operation (including octree colorization) described with reference to FIGS. 1 to 26.

Point cloud (PCC) data or point cloud compression (PCC) data is input data to the point cloud encoder 2700 and may include geometry and/or attributes. The geometry according to the embodiments is information indicating a position (e.g., a location) of a point, and may be represented as parameters of a coordinate system such as orthogonal coordinates, cylindrical coordinates, or spherical coordinates. The attribute according to the embodiments indicates an attribute of a point (e.g., color, transparency, reflectance, grayscale, etc.). The geometry may be referred to as geometry information (or geometry data), and the attribute may be referred to as attribute information (or attribute data).

The point cloud encoder 2700 according to the embodiments performs octree generation 2710, geometry prediction 2720 and entropy encoding 2730 to perform the geometry coding (or geometry encoding) described with reference to FIGS. 1 to 26, and outputs a geometry bitstream. The octree generation 2710, the geometry prediction 2720, and the entropy encoding 2730 according to the embodiments are the same as or similar to the operations of the coordinate transformer 40000, quantizer 40001, octree analyzer 40002, and surface approximation analyzer 40003, the arithmetic encoder 40004, and geometry reconstructor 40005 described with reference to FIG. 4, and/or the operations of the data input unit 12000, quantization processor 12001, voxelization processor 12002, octree occupancy code generator 12003, surface model processor 12004, intra/inter-coding processor 12005, arithmetic coder 12006, metadata processor 12007 described with reference to FIG. 12, and thus a detailed description thereof will be omitted.

In order to perform the attribute coding (or attribute encoding) described with reference to FIGS. 1 to 26, the point cloud encoder 2700 according to the embodiments performs colorized octree generation 2740, attribute prediction 2750, transform 2760, quantization 2770, and entropy encoding 2780.

The colorized octree generation 2740, attribute prediction 2750, transform 2760, quantization 2770, and entropy encoding 2780 according to the embodiments are the same as or similar to the operations of the geometry reconstructor 40005, color transformer 40006, attribute transformer 40007, RAHT transformer 40008, LOD generator 40009, lifting transformer 40010, coefficient quantizer 40011 and/or arithmetic encoder 40012 described with reference to FIG. 4, and/or the operations of the color transform processor 12008, attribute transform processor 12009, prediction/lifting/RAHT transform processor 12110, and arithmetic coder 12011 described with reference to FIG. 12, and thus a detailed description thereof will be omitted.

The point cloud encoder 2700 according to the embodiments generates a colorized octree based on the octree structure generated in the octree generation 2710 or information on the octree structure (2740). The colorized octree generation according to the embodiments is the same as or similar to the octree colorization described with reference to FIGS. 18 to 24. The point cloud encoder 2700 according to the embodiments predicts (estimates) and removes similarity between attributes for each depth level based on the colorized octree (attribute prediction 2750). The point cloud encoder 2700 according to the embodiments performs the attribute prediction 2750 based on spatial distribution of adjacent data. The point cloud encoder 2700 transforms the predicted attribute into a format suitable for transmission or a domain with high compression efficiency (2760). The point cloud encoder 2700 may or may not perform transformation based on various transformation methods (e.g., DCT type transform, lifting transform, RAHT, wavelet transform, etc.) according to data types. Thereafter, the point cloud encoder 2700 quantizes the transformed attribute (2770), and performs entropy encoding to transform the same into bit-unit data for transmission (2780).

The point cloud encoder 2700 according to the embodiments may perform attribute encoding based on the colorized octree structure.

The point cloud encoder 2700 according to the embodiments detects neighbor nodes. As described with reference to FIGS. 18 to 26, the neighbor nodes are child nodes belonging to the same parent node. In the octree structure according to the embodiments, the child nodes are highly likely to have adjacent positions. Accordingly, the point cloud encoder 2700 performs prediction on the current node among the child nodes on the assumption that the child nodes are adjacent to each other in a three-dimensional space composed of x, y, and z axes. The point cloud encoder 2700 according to the embodiments may obtain a predicted value for each child node. In addition, the point cloud encoder 2700 defines child nodes belonging to the same parent node as sibling nodes and defines the sibling nodes to have the same predicted value to reduce the number of coefficients required for encoding of each child node and perform high-efficiency encoding. Also, the same predicted value may be used as an attribute of an occupied node, and may be used in predicting an attribute matched with the parent node. The equation given below represents a predicted attribute at level l and a predicted attribute at level l-1.

$$p_l(x, y, z) = f_{(x,y,z) \in NEIGHBOR}\{c_l(x, y, z)\} = \sum_{k,l,m=0}^{1} c_l(2 \times \lfloor x/2 \rfloor + k, 2 \times \lfloor y/2 \rfloor + l, 2 \times \lfloor z/2 \rfloor + m)$$

$$p_{l-1}(x, y, z) = p_l(\lfloor x/2 \rfloor, \lfloor y/2 \rfloor, \lfloor z/2 \rfloor)$$

[Equation 8]

In the equation, $\lfloor a/b \rfloor$ denotes the quotient obtained when a is divided by b. In the equation, Cl denotes the l-th attribute. k, l, and m are parameters for defining a position of a peripheral node (or a neighbor node) with respect to position (x, y, z).

The point cloud encoder 2700 according to the embodiments calculates an attribute prediction error for each child node based on the predicted attribute. The equation given below represents the residual (rl(x,y,z)) between the original attribute value and the predicted attribute value as a method of calculating the attribute prediction error for each child node.

$$r_l(x, y, z) = g\{c_l(x, y, z), p_l(x, y, z)\} = c_l(x, y, z) - p_l(x, y, z) \quad \text{[Equation 9]}$$

In the equation, rl(x,y,z) denotes a residual of the l-th node having position (x,y,z). cl(x,y,z) denotes an actual attribute (e.g. color) of the l-th node having position (x,y,z), and pl(x,y,z) denotes an estimated attribute (or predicted value) of the l-th node having position (x,y,z).

The method of calculating the attribute prediction error according to the embodiments is not limited to this example and may be based on various methods (e.g., weighted difference, weighted averaged difference, etc.).

As described above, in the octree structure, which is an octal tree structure, the depth increases from an upper node to a lower node. The depth according to the embodiments is referred to as a level and/or a layer. Thus, an upper node corresponds to a lower level and a lower node corresponds to a higher level (e.g., the highest node corresponds to level 0, and the lowest node corresponds to level n). According to embodiments, the level may be set to decrease from an upper node to a lower node (e.g., the highest node is level n and the lowest node is level 0). The point cloud encoder 2700 according to the embodiments may signal a predicted attribute value for the highest level and may signal an attribute prediction error for lower levels. In addition, the point cloud encoder 2700 according to the embodiments may determine the data (attribute) delivery order for each level (level in the octree structure) in consideration of the decoding process. For example, the point cloud encoder 2700 deliver the data in ascending order of levels (for example, data delivery starts with the predicted attribute value of the upper node and proceeds to lower nodes). At the same level, data may be delivered in ascending order of coordinate values on the x, y, and z axes (for example, in Morton code order based on the Morton code). According to embodiments, the point cloud encoder 2700 may perform reordering. In addition, the point cloud encoder 2700 according to the embodiments performs quantization represented by the equation below on the predicted attribute value and the attribute prediction error.

$$d'_l(x, y, z) = Q\{d_l(x, y, z)\} = \text{round}[d_l(x, y, z)/q] \quad \text{[Equation 10]}$$

In the equation, q is a quantization coefficient, and the degree of quantization is determined according to the quantization coefficient. dl(x,y,z) denotes data of the l-th node having position (x,y,z) that is to be quantized. dl'(x, y, z) denotes quantized data.

The point cloud encoder 2700 according to the embodiments may use a different quantization coefficient according to the predicted attribute value and attribute prediction error or for each level.

Information (e.g., scalable representation information) related to geometry coding and attribute coding of the point cloud encoder 2700 according to the embodiments may be transmitted to the reception device over the bitstream described with reference to FIGS. 25 and 26.

Figure 28:
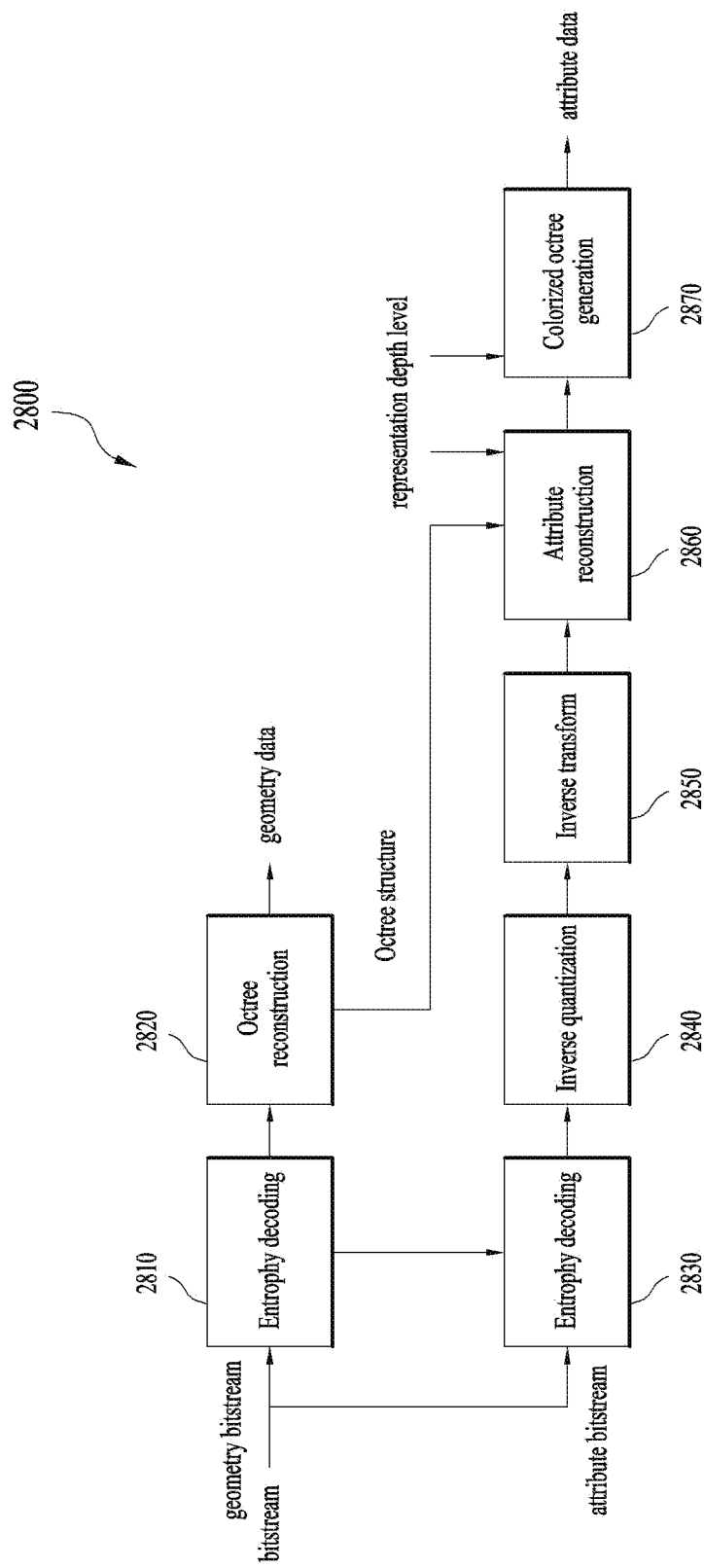
FIG. 28 is a block diagram illustrating a decoding operation of a point cloud decoder.

FIG. 28 is a block diagram illustrating a decoding operation of a point cloud decoder.

The point cloud decoder 2800 according to the embodiments performs an operation corresponding to the reverse process of the operation of the point cloud encoder 2700 described with reference to FIG. 27. The point cloud decoder 2800 (e.g., the point cloud video decoder 10006 described with reference to FIG. 10, the point cloud decoder described with reference to FIG. 11, the point cloud decoder described with reference to FIG. 19, or the like) according to the embodiments may perform the decoding operation described above with reference to FIGS. 1 to 25.

The point cloud decoder 2800 according to the embodiments receives a bitstream. The bitstream according to the embodiments (e.g., the bitstream described with reference to FIGS. 25 and 26) includes a geometry bitstream and an attribute bitstream. The geometry bitstream according to the embodiments may include a full geometry or a partial geometry. Since the bitstream according to the embodiments includes the scalable representation information described with reference to FIGS. 25 and 26, the point cloud decoder 2800 may perform the scalable representation described with reference to FIGS. 18 to 26 based on the scalable representation information.

The point cloud decoder 2800 according to the embodiments performs entropy decoding 2810 on the geometry bitstream to perform the geometry coding (or geometry decoding) described with reference to FIGS. 1 to 26, and perform octree reconstruction 2820 to output geometry data and an octree structure.

The entropy decoding 2810 and octree reconstruction 2820 according to the embodiments are the same as or similar to the operations of the arithmetic decoder 11000, the octree synthesizer 11001, the surface approximation synthesizer 11002, the geometry reconstructor 11003, and the coordinate inverse transformer 11004 described with reference to FIG. 11.

Accordingly, a detailed description thereof will be omitted.

The point cloud decoder 2800 according to the embodiments performs the attribute coding (or attribute decoding) described with reference to FIGS. 1 to 26 by performing entrophy decoding 2830, inverse quantization 2840, inverse transform 2850, attribute reconstruction 2860, and colorized octree generation 2870 on the attribute bitstream, and outputs attribute data. The entropy decoding 2830, the inverse quantization 2840, the inverse transform 2850, and the attribute reconstruction 2860 according to the embodiments are the same as or similar to the operations of the arithmetic decoder 11005, the inverse quantizer 11006, the RAHT transformer 11007, the LOD generator 11008, the inverse lifter 11009, and/or the color inverse transformer 11010 described with reference to FIG. 11, and therefore a detailed description thereof will be omitted. The inverse quantization 2840 and the inverse transform 2850 according to the embodiments may or may not be executed according to the operation of the point cloud encoder 2700 of FIG. 27.

The point cloud decoder 2800 according to the embodiments performs the attribute reconstruction 2860 based on the octree structure output from the octree reconstruction 2820 and the scalable representation depth level (or the scalable representation level). The scalable representation depth level according to the embodiments may be determined by the reception device according to performance. In addition, the scalable representation depth level according to the embodiments may be determined by the point cloud encoder (e.g., the point cloud encoder 2700) and transmitted together with the encoded point cloud data. The point cloud decoder 2800 detects neighbor nodes based on the octree structure for reconstructing position information, similarly to the point cloud encoder 2700 described with reference to FIG. 27. The point cloud decoder 2800 according to the embodiments may detect neighbor nodes (e.g., child nodes belonging to the same parent node described with reference to FIG. 27) according to the definition of the neighbor nodes signaled through the signaling information included in the bitstream. The point cloud decoder 2800 according to the embodiments may predict an attribute in the reverse order of the attribute prediction performed by the cloud encoder. For example, when the attribute prediction is performed by the point cloud encoder in descending order of level (e.g., in the direction from leaf node to root node), the point cloud decoder 2800 predicts the attributes in ascending order of level (e.g., in the direction from the root node to the leaf node). The point cloud decoder 2800 according to the embodiments uses the reconstructed attribute of the parent node as a predicted value for the child nodes in the same manner as the attribute prediction of the point cloud encoder. According to embodiments, when one or more prediction methods are used, the bitstream described above may include information on the one or more prediction methods.

The point cloud decoder 2800 may predict an attribute based on signaling information transmitted through the bitstream. The equation below represents the attribute prediction process of the point cloud decoder 2800.

$$\hat{p}_l(x, y, z) = \hat{c}_{l-1}(2 \times \lfloor x/2 \rfloor, \lfloor 2 \times y/2 \rfloor, 2 \times \lfloor z/2 \rfloor) \quad \text{[Equation 11]}$$

The point cloud decoder 2800 according to the embodiments may reconstruct the attribute of each child node based on the predicted attribute (2860). The attribute reconstruction 2860 of the point cloud decoder 2800 corresponds to the reverse process of the attribute prediction 2750 of the point cloud encoder 2700 described with reference to FIG. 27. As described with reference to FIG. 27, in the case where the point cloud encoder 2700 generates an attribute prediction error, the point cloud decoder 2800 may reconstruct the attribute by adding the predicted attribute and the decoded attribute prediction error. The equation below represents the attribute reconstruction process.

$$\hat{c}_l(x, y, z) = \quad \text{[Equation 12]}$$
$$g^{-1}\{\hat{r}_l(x, y, z), \hat{p}_l(x, y, z)\} = \hat{p}_l(x, y, z) + \hat{r}_l(x, y, z)$$

The colorized octree generation 2870 according to the embodiments is performed for scalable decoding or scalable representation. The point cloud decoder 2800 according to the embodiments generates a colorized octree based on the octree structure output in the octree reconstruction 2820 and the scalable representation depth level (or the scalable representation level) (Colorized octree generation 2870).

The colorized octree generation 2870 according to the embodiments is the same as or similar to the octree colorization described with reference to FIGS. 18 to 24. Accordingly, the reception device or the point cloud decoder 2800 may provide point cloud content of various resolutions.

Figure 29:
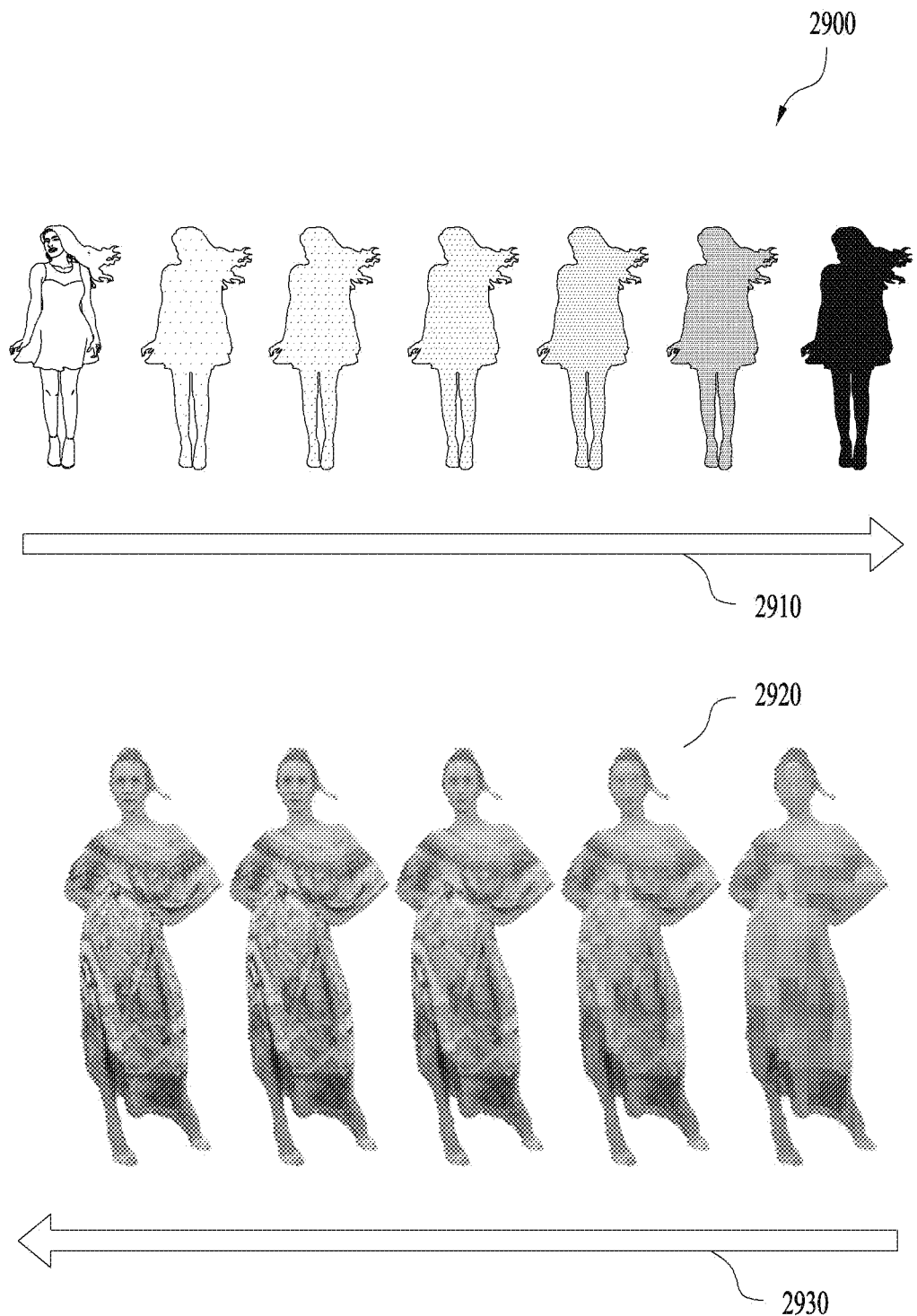
FIG. 29 shows details of geometry and attributes according to scalable decoding according to embodiments.

FIG. 29 shows details of geometry and attributes according to scalable decoding according to embodiments.

The upper part of FIG. 29 is an example 2900 illustrating details of geometry according to scalable decoding. A first arrow 2910 indicates a direction from an upper node to a lower node in the octree. As shown in the figure, as scalable decoding proceeds from the upper node to the lower node in the octree, more points are present, and thus the detail of the geometry increases. The leaf nodes of the octree structure correspond to the top level detail of the geometry.

The lower part of FIG. 29 is an example 2920 illustrating details of an attribute according to scalable decoding. A second arrow 2930 indicates a direction from an upper node to a lower node in the octree. As shown in the figure, as scalable decoding proceeds from the upper node to the lower node in the octree, the detail of the attribute increases.

Figure 30:
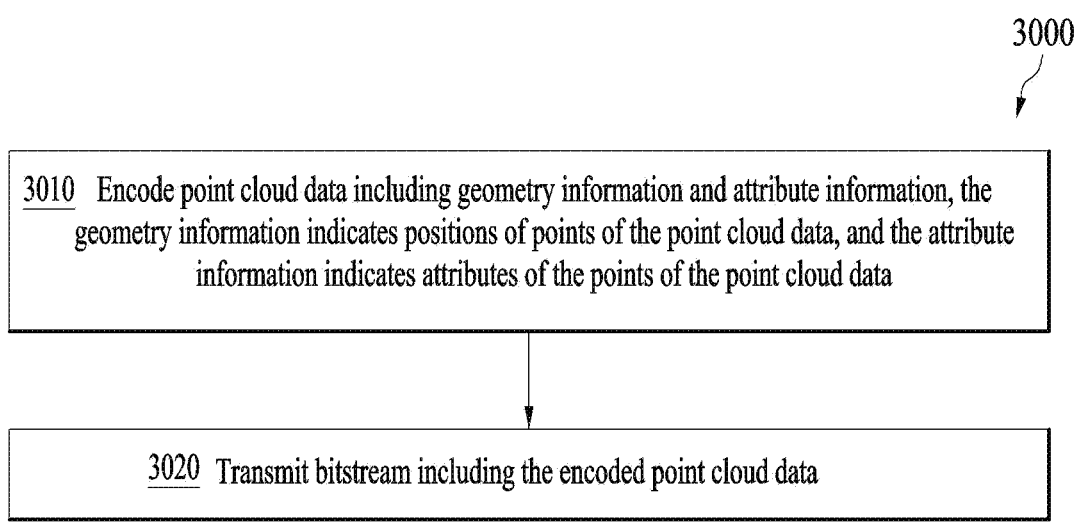
FIG. 30 is an exemplary flow diagram of a method for processing point cloud data according to embodiments.

FIG. 30 is an exemplary flow diagram of a method for processing point cloud data according to embodiments.

The flow diagram 3000 of FIG. 30 illustrates a point cloud data processing method carried out by a point cloud data processing device (e.g., the transmission device described with reference to FIGS. 1, 11, 14, 15, and 18, or the point cloud data encoder 2700 described with reference to FIG. 27). The point cloud data processing device according to the embodiments may perform the same or similar operation to the encoding operation described with reference to FIGS. 1 to 27.

The point cloud data processing device according to the embodiments may encode point cloud data including geometry information and attribute information (3010). The geometry information according to the embodiments indicates positions of points of the point cloud data. The attribute information according to the embodiments indicates attributes of the points of the point cloud data.

The point cloud data processing device according to the embodiments may encode the geometry information and encode the attribute information. The point cloud data processing device according to the embodiments performs the same or similar operation to the geometry information encoding described with reference to FIGS. 1 to 27. Also, the point cloud data processing device performs the same or similar operation to the attribute information encoding described with reference to FIGS. 1 to 27. The point cloud data processing device according to embodiments receives an octree structure of the geometry information. The octree structure is represented by one or more levels. The point cloud data processing device according to the embodiments generates a colorized octree by matching one or more attributes with each level of the octree structure (or by matching an attribute with a node of each level). The colorized octree according to the embodiments is used to encode the attribute information so as to perform scalable representation of some or all of the attribute information.

Since the geometry information encoding and the attribute information encoding according to the embodiments are the same as or similar to the geometry information encoding and the attribute information encoding described with reference to FIGS. 1 to 27, a detailed description thereof will be omitted.

The point cloud data processing device according to the embodiments may transmit a bitstream including the encoded point cloud data (3020).

Since the structure of the bitstream according to the embodiments is the same as that described with reference to FIGS. 25 and 26, a detailed description thereof will be omitted. The bitstream according to the embodiments may include scalable representation information (e.g., the scalable representation information described with reference to FIGS. 18 to 26). The scalable representation information according to the embodiments may be transmitted through an APS and attribute data of an attribute slice as described with reference to FIGS. 25 and 26, and is not limited to the above-described example.

The scalable representation information according to the embodiments includes information indicating whether scalable representation is available (e.g., scalable_representation_available_flag described with reference to FIG. 25). When the information indicates that the scalable representation is available, the scalable representation information further includes information (e.g., octree_colorization_type described with reference to FIG. 25) indicating a method of generating a colorized octree structure. The information indicating the method of generating a colorized octree structure according to the embodiments indicates that the method of generating a colorized octree structure is at least one of a method of matching one or more arbitrary attributes with each level of the octree structure (e.g., octree_colorization_type is equal to 0, and the colorized octree is an attribute paired octree (e.g., the attribute paired octree described with reference to FIG. 23)) and a method of matching the actual attribute and position of a lower levels of a level with each level of the octree structure (e.g., octree_colorization_type is equal to 1, and the colorized octree is a point paired octree (e.g., the point paired octree described with reference to FIG. 24)). Details of the scalable representation information according to the embodiments are the same as those described with reference to FIGS. 18 to 26, and thus a description thereof will be omitted.

Figure 31:
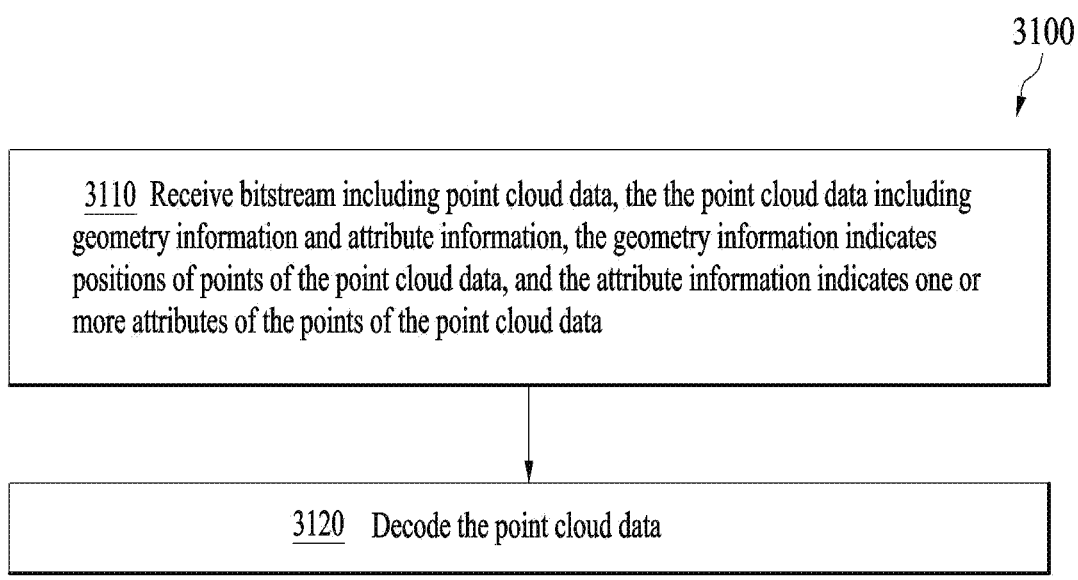
FIG. 31 is an exemplary flow diagram of a method for processing point cloud data according to embodiments.

FIG. 31 is an exemplary flow diagram of a method for processing point cloud data according to embodiments.

The flow diagram 3100 of FIG. 31 illustrates a point cloud data processing method carried out a point cloud data processing device (e.g., the point cloud data reception device described with reference to FIGS. 1, 13, 14, 16 and 25 or the point cloud data decoder 2800 of FIG. 28)). The point cloud data processing device according to the embodiments may perform the same or similar operation to the decoding operation described with reference to FIGS. 1 to 28.

The point cloud data processing device according to the embodiments receives a bitstream including point cloud data (3110). Geometry information according to the embodiments indicates positions of points of the point cloud data. Attribute information according to the embodiments indicates attributes of the points of the point cloud data. The structure of the bitstream according to the embodiments is the same as that described with reference to FIGS. 25 and 26, and thus a detailed description thereof will be omitted.

The point cloud data processing device according to the embodiments decodes the point cloud data (3120).

The point cloud data processing device according to the embodiments may decode the geometry information and decode the attribute information. The point cloud data processing device according to the embodiments performs the same or similar operation to the geometry information decoding described with reference to FIGS. 1 to 28. In addition, the point cloud data processing device performs the same or similar operation to the attribute information decoding described with reference to FIGS. 1 to 28.

The bitstream according to the embodiments may include scalable representation information (e.g., the scalable representation information described with reference to FIGS. 25 and 26). The scalable representation information according to the embodiments may be transmitted through an APS and attribute data of an attribute slice as described with reference to FIGS. 25 and 26, and is not limited to the above-described example.

The scalable representation information according to the embodiments includes information indicating whether scalable representation is available (e.g., scalable_representation_available_flag described with reference to FIG. 25). When the information indicates that the scalable representation is available, the scalable representation information further includes information (e.g., octree_colorization_type described with reference to FIG. 25) indicating a method of generating a colorized octree structure. The information indicating the method of generating a colorized octree structure according to the embodiments indicates that the method of generating a colorized octree structure is at least one of a method of matching one or more arbitrary attributes with each level of the octree structure (e.g., octree_colorization_type is equal to 0, and the colorized octree is an attribute paired octree (e.g., the attribute paired octree described with reference to FIG. 23)) and a method of matching the actual attribute and position of a lower levels of a level with each level of the octree structure (e.g., octree_colorization_type is equal to 1, and the colorized octree is a point paired octree (e.g., the point paired octree described with reference to FIG. 24)). Details of the scalable representation information according to the embodiments are the same as those described with reference to FIGS. 18 to 26, and thus a description thereof will be omitted.

The point cloud data processing device receives the octree structure of the decoded geometry information. The octree structure according to the embodiments is represented by one or more levels. The point cloud data processing device according to the embodiments generates a colorized octree by matching one or more attributes with each level of the octree structure (or matching an attribute to a node of each level) based on the scalable representation information. As described with reference to FIGS. 1 to 28, the colorized octree is used for the scalable representation.

Components of the point cloud data processing devices according to the embodiments described with reference to FIGS. 1 to 31 may be implemented as hardware, software, firmware, or a combination thereof including one or more processors coupled with a memory. The components of the devices according to the embodiments may be implemented as a single chip, for example, a single hardware circuit. Alternatively, the components of the point cloud data processing devices according to the embodiments may be implemented as separate chips. In addition, at least one of the components of the point cloud data processing devices according to the embodiments may include one or more processors capable of executing one or more programs, wherein the one or more programs may include are instructions that execute or are configured to execute one or more of the operations/methods of the point cloud data processing devices described with reference to FIGS. 1 to 31.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Descriptions of methods and devices may be applied so as to complement each other. For example, the point cloud data transmission method according to the embodiments may be carried out by the point cloud data transmission device or components included in the point cloud data transmission device according to the embodiments. Also, the point cloud data reception method according to the embodiments may be carried out by the point cloud data reception device or components included in the point cloud data reception device according to the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

As described above, related contents have been described in the best mode for carrying out the embodiments.

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method comprising:
encoding geometry information of point cloud data based on an occupancy tree; and
encoding attribute information of the point cloud data based on a level of detail for the attribute information; and
transmitting a bitstream including the encoded point cloud data,
wherein the bitstream includes scalability information for representing the point cloud data in a partial occupancy tree, and
wherein points of the level of detail are assigned into nodes of the occupancy tree based on the scalability information.

2. The method of claim 1,
wherein a centroid point of the geometry information is selected.

3. The method of claim 1, wherein, based on the scalability information representing that decoding for the attribute information is based on partial reconstructed geometry information, the encoded attribute information are partially decoded with indexes of the points represented by the partial reconstructed geometry information.

4. A device comprising:
a memory; and
at least one processor connected to the memory, the at least one processor configured to:
encode geometry information of point cloud data based on an occupancy tree; and
encode attribute information of the point cloud data based on a level of detail for the attribute information; and
transmit a bitstream including the encoded point cloud data,
wherein the bitstream includes scalability information for representing the point cloud data in a partial occupancy tree, and
wherein points of the level of detail are assigned into nodes of the occupancy tree based on the scalability information.

5. The device of claim 4,
wherein a centroid point of the geometry information is selected.

6. The device of claim 4, wherein, based on the scalability information representing that decoding for the attribute information is based on partial reconstructed geometry information, the attribute information are partially decoded with indexes of the points represented by the partial reconstructed geometry information.

7. A method comprising:
receiving a bitstream including point cloud data including geometry information and attribute information;
decoding the geometry information based on an occupancy tree; and
decoding the attribute information based on a level of detail for the attribute information,
wherein the bitstream further includes scalability information for representing the point cloud data in a partial occupancy tree, and
wherein points of the level of detail are assigned into nodes of the occupancy tree based on the scalability information.

8. The method of claim 7,
wherein a centroid point of the geometry information is selected.

9. The method of claim 7, wherein, based on the scalability information representing that decoding for the attribute information is based on partial reconstructed geometry information, the attribute information are partially decoded with indexes of the points represented by the partial reconstructed geometry information.

10. A device comprising:
a memory; and
at least one processor connected to the memory, the at least one processor configured to:
receive a bitstream including point cloud data including geometry information and attribute information;
decode the geometry information based on an occupancy tree; and
decode the attribute information based on a level of detail for the attribute information,
wherein the bitstream further includes scalability information for representing the point cloud data in a partial occupancy tree, and
wherein points of the level of detail are assigned into nodes of the occupancy tree based on the scalability information.

11. The device of claim 10,
wherein a centroid point of the geometry information is selected.

12. The device of claim 10, wherein, based on the scalability information representing that decoding for the attribute information is based on partial reconstructed geometry information, the attribute information are partially decoded with indexes of the points represented by the partial reconstructed geometry information.

* * * * *